US012620109B2

(12) United States Patent
Shi et al.

(10) Patent No.: US 12,620,109 B2
(45) Date of Patent: May 5, 2026

(54) LEARNING RELIABLE KEYPOINTS IN SITU WITH INTROSPECTIVE SELF-SUPERVISION

(71) Applicant: Intel Corporation, Santa Clara, CA (US)

(72) Inventors: Xuesong Shi, Beijing (CN); Sangeeta Manepalli, Chandler, AZ (US); Rita Chattopadhyay, Chandler, AZ (US); Peng Wang, Beijing (CN); Yimin Zhang, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 167 days.

(21) Appl. No.: 18/565,791

(22) PCT Filed: Sep. 23, 2021

(86) PCT No.: PCT/CN2021/119869
§ 371 (c)(1),
(2) Date: Nov. 30, 2023

(87) PCT Pub. No.: WO2023/044661
PCT Pub. Date: Mar. 30, 2023

(65) Prior Publication Data
US 2024/0257374 A1 Aug. 1, 2024

(51) Int. Cl.
*G06T 7/579* (2017.01)
*G06T 7/73* (2017.01)

(52) U.S. Cl.
CPC ................ *G06T 7/579* (2017.01); *G06T 7/73* (2017.01); *G06T 2207/20081* (2013.01); *G06T 2207/20084* (2013.01)

(58) Field of Classification Search
CPC . G06T 2207/20081; G06T 2207/20084; G06T 7/579; G06T 7/73; G06V 10/462; G06V 10/74; G06V 10/82
See application file for complete search history.

(56) References Cited

U.S. PATENT DOCUMENTS

2018/0268256 A1* 9/2018 Di Febbo ............. G06V 10/764
2019/0355150 A1 11/2019 Tremblay et al.

FOREIGN PATENT DOCUMENTS

CN 110147767 A 8/2019
CN 112435296 A 3/2021
(Continued)

OTHER PUBLICATIONS

International Preliminary Report on Patentability, PCT Application No. PCT/CN2021/119869, Apr. 4, 2024, 6 pages, WIPO.
(Continued)

*Primary Examiner* — Manuchehr Rahmjoo
(74) *Attorney, Agent, or Firm* — JAFFERY WATSON HAMILTON & DESANCTIS LLP

(57) ABSTRACT

An apparatus to facilitate learning reliable keypoints in situ with introspective self-supervision is disclosed. The apparatus includes one or more processors to provide a view-overlapped keyframe pair from a pose graph that is generated by a visual simultaneous localization and mapping (VSLAM) process executed by the one or more processors; determine a keypoint match from the view-overlapped keyframe pair based on a keypoint detection and matching process, the keypoint match corresponding to a keypoint; calculate an inverse reliability score based on matched pixels corresponding to the keypoint match in the view-overlapped keyframe pair; identify a supervision signal associated with the keypoint match, the supervision signal comprising a keypoint reliability score of the keypoint based on a final pose output of the VSLAM process; and train a
(Continued)

200 keypoint detection neural network using the keypoint match, the inverse reliability score, and the keypoint reliability score.

17 Claims, 12 Drawing Sheets

(56) References Cited

FOREIGN PATENT DOCUMENTS

| | | | |
|---|---|---|---|
| CN | 112800937 | A | 5/2021 |
| CN | 117730348 | A | 3/2024 |
| WO | 2023044661 | A1 | 3/2023 |

OTHER PUBLICATIONS

Chinese Patent Application No. 202180100012.X "Notice of Publication of Patent Application for Invention" mailed Mar. 19, 2024, 2 pages (with translation).
International Search Report & Written Opinion, PCT Application No. PCT/CN2021/119869, May 30, 2022, 8 pages, NIPO.

* cited by examiner

RGB Components     Convolutional Layers     Fully Connected Layers

Input to Convolutional Layer
312

Convolutional Layer
314

Convolution Stage
316

Detector Stage
318

Pooling Stage
320

Next layer
322

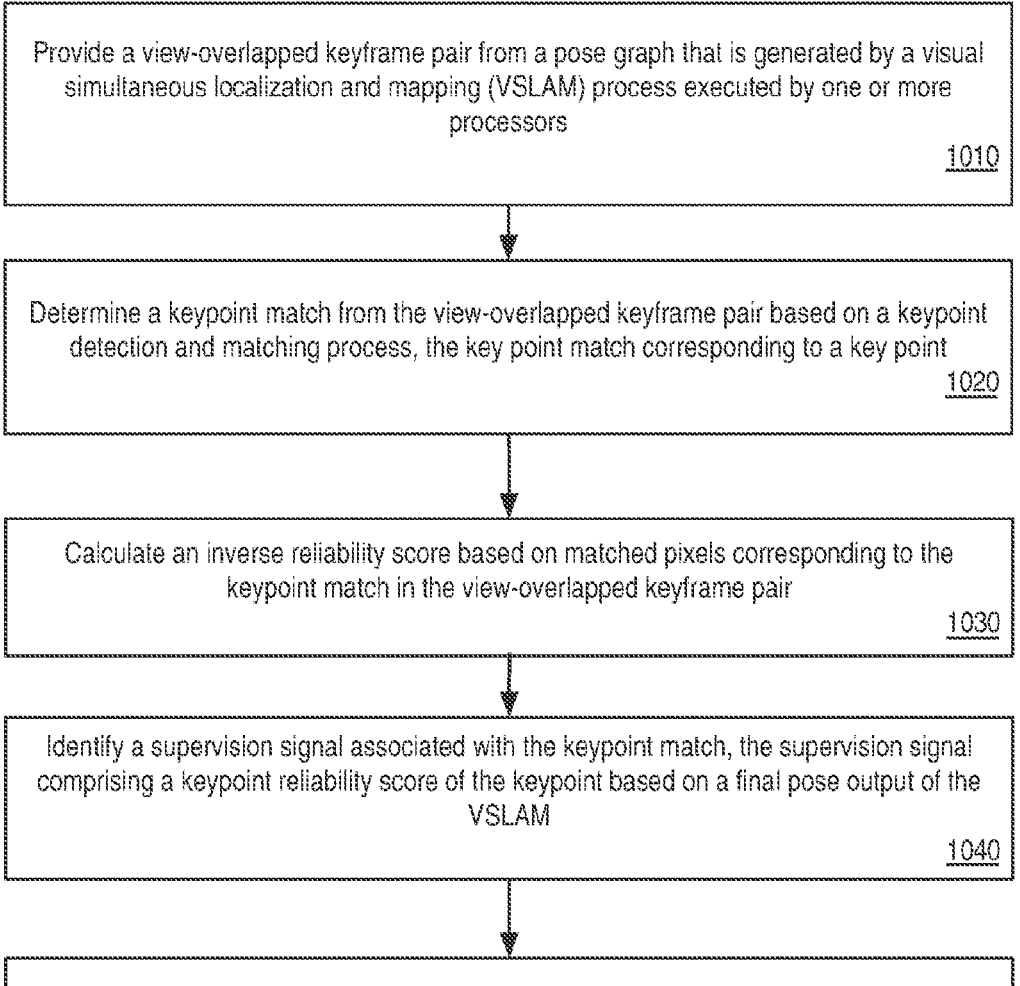

1000

Provide a view-overlapped keyframe pair from a pose graph that is generated by a visual simultaneous localization and mapping (VSLAM) process executed by one or more processors

1010

Determine a keypoint match from the view-overlapped keyframe pair based on a keypoint detection and matching process, the key point match corresponding to a key point

1020

Calculate an inverse reliability score based on matched pixels corresponding to the keypoint match in the view-overlapped keyframe pair

1030

Identify a supervision signal associated with the keypoint match, the supervision signal comprising a keypoint reliability score of the keypoint based on a final pose output of the VSLAM

1040

Train a keypoint detection neural network using the keypoint match, the inverse reliability score, and the keypoint reliability score

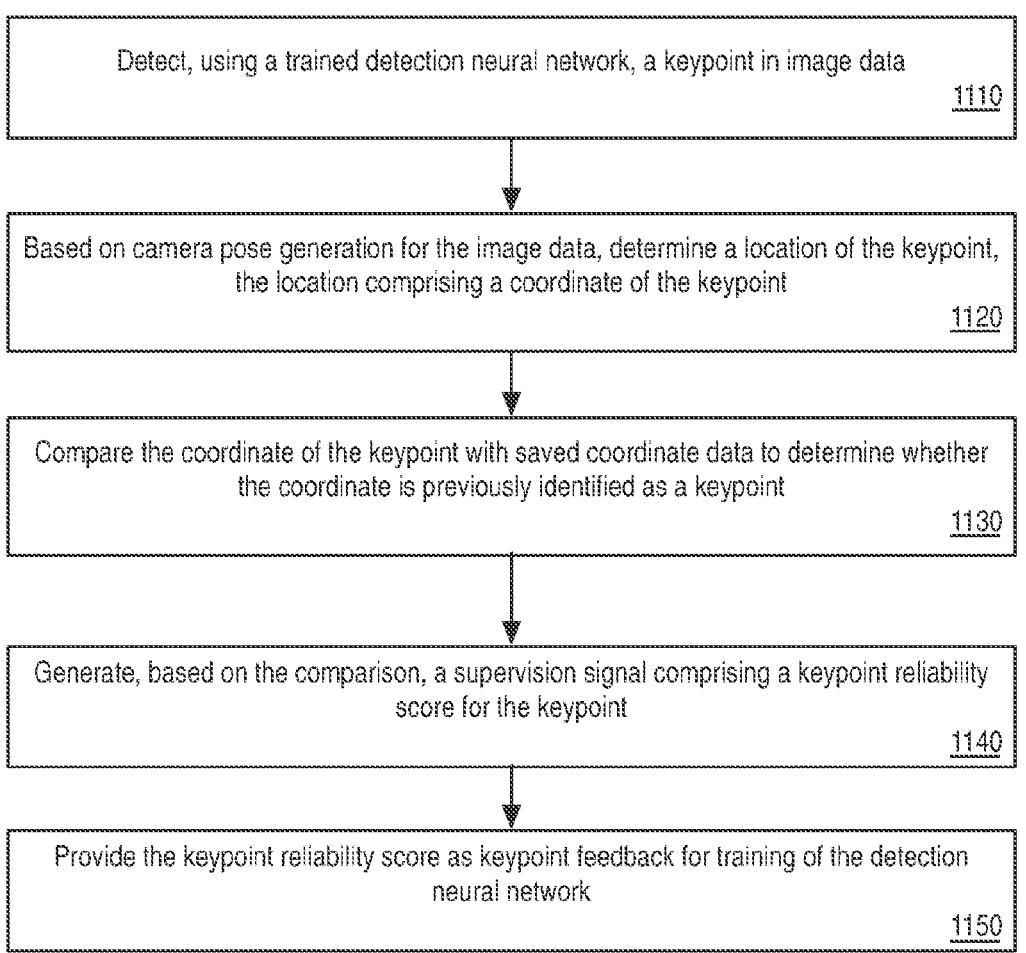

1100

Detect, using a trained detection neural network, a keypoint in image data
1110

Based on camera pose generation for the image data, determine a location of the keypoint, the location comprising a coordinate of the keypoint
1120

Compare the coordinate of the keypoint with saved coordinate data to determine whether the coordinate is previously identified as a keypoint
1130

Generate, based on the comparison, a supervision signal comprising a keypoint reliability score for the keypoint
1140

Provide the keypoint reliability score as keypoint feedback for training of the detection neural network
1150

*FIG. 11*

LEARNING RELIABLE KEYPOINTS IN SITU WITH INTROSPECTIVE SELF-SUPERVISION

CROSS-REFERENCE TO RELATED APPLICATIONS

The present application is a 35 U.S.C. § 371 National Stage Patent Application of International Patent Application PCT/CN2021/119869, filed on Sep. 23, 2021.

FIELD

Embodiments relate generally to data processing and more particularly to learning reliable keypoints in situ with introspective self-supervision.

BACKGROUND OF THE DESCRIPTION

Neural networks and other types of machine learning models are useful tools that have demonstrated their value solving complex problems regarding pattern recognition, natural language processing, automatic speech recognition, etc. Neural networks operate using artificial neurons arranged into one or more layers that process data from an input layer to an output layer, applying weighting values to the data during the processing of the data. Such weighting values are determined during a training process and applied during an inference process.

One example application for machine learning models is in the technology of autonomous robot localization. One technique used in robot localization is visual simultaneous localization and mapping (VSLAM). When implementing VSLAM, the robustness and accuracy of the robot's navigation is based on the number and quality of matchable keypoints from each image. Recent research shows that deep learning (DL)-based keypoint detection outperforms traditional keypoint detection techniques for VSLAM. Another advantage is that DL-based detection can provide is that it can be tuned to the specific environment the robots are working in. As such, creating supervision for the training with unlabeled images, especially when the robot is deployed, would contribute to the performance of DL-based keypoint detection used in autonomous robot localization.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate typical embodiments and are therefore not to be considered limiting of its scope. The figures are not to scale. In general, the same reference numbers are used throughout the drawing(s) and accompanying written description to refer to the same or like parts.

FIG. 10 is a flow diagram illustrating an embodiment of a method for training a neural network for learning reliable keypoints in situ with introspective self-supervision, in accordance with implementations herein.

FIG. 11 is a flow diagram illustrating an embodiment of a method for inference using a neural network trained for learning reliable keypoints in situ with introspective self-supervision, in accordance with implementations herein.

DETAILED DESCRIPTION

Figure 1:
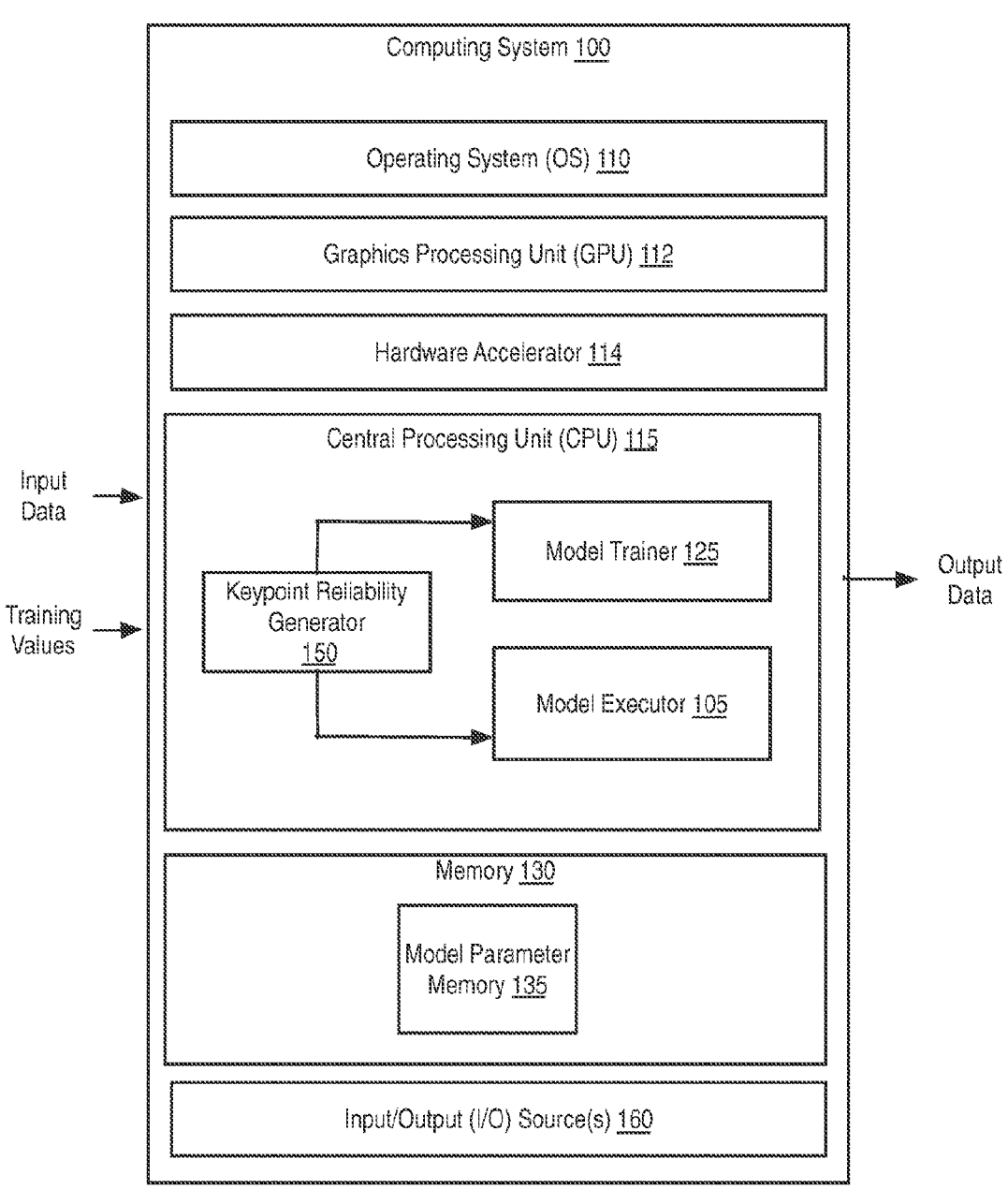
FIG. 1 is a block diagram of an example computing system that may be used to provide learning reliable keypoints in situ with introspective self-supervision, according to implementations of the disclosure.

Implementations of the disclosure describe learning reliable keypoints in situ with introspective self-supervision. In computer engineering, computing architecture is a set of rules and methods that describe the functionality, organization, and implementation of computer systems. Today's computing systems are expected to deliver near zero-wait responsiveness and superb performance while taking on large workloads for execution. Therefore, computing architectures have continually changed (e.g., improved) to accommodate demanding workloads and increased performance expectations.

Examples of large workloads include neural networks, artificial intelligence (AI), machine learning (ML), etc. Such workloads have become more prevalent as they have been implemented in a number of computing devices, such as personal computing devices, business-related computing devices, etc. Furthermore, with the growing use of large machine learning and neural network workloads, new silicon has been produced that is targeted at running large workloads. Such new silicon includes dedicated hardware accelerators (e.g., graphics processing unit (GPU), field-programmable gate array (FPGA), vision processing unit (VPU), etc.) customized for processing data using data parallelism.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In some examples disclosed herein, a convolutional neural network is used. Using a convolutional neural network enables classification of objects in images, natural language processing, etc. In general, machine learning models/architectures that are suitable to use in the example approaches disclosed herein may include convolutional neural networks. However, other types of machine learning models could additionally or alternatively be used such as recurrent neural network, feedforward neural network, etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

One example application for machine learning models is in the technology of autonomous robot localization. A technique used in autonomous robot localization is visual simultaneous localization and mapping (VSLAM). When implementing VSLAM, the robustness and accuracy of the robot's navigation is based on the number and quality of matchable keypoints from each image. A "keypoint" as discussed herein may refer to an noteworthy point or object in an image. Keypoints are spatial locations, or points in the image that define what is interesting and/or what stands out in the image. In some examples, keypoints may be the corner of a doorframe, a wall, a stationary object such as a table or a desk, a post, a building, a distinct landform, and so on. In VSLAM, keypoints are detected in an image to aid in mapping an environment for navigation purposes. As such, keypoint detection is a key aspect of robot localization techniques, such as VSLAM, and ML/AI models are often utilized to aid in keypoint detection.

For example, recent research shows that deep learning (DL)-based keypoint detection outperforms traditional ones for SLAM. Moreover, DL-based keypoint detection can be tuned to the specific environment the robots are working in. The challenge is how to create supervision for the training with unlabeled images, especially when the robot is deployed.

Conventional approaches to detecting and/or selecting keypoints in input image data are based on different heuristics, such as distribution uniformity or visual saliency. These conventional approaches perform the keypoint selection on top of the detection results of a keypoint detector. As such, these methods do not focus on the keypoint detection process itself, but rather focus on selecting from a number of already detected keypoints.

Some conventional approaches have provided learning-based keypoint detectors. As human annotation for keypoints is not feasible, all of the conventional approaches for learning-based keypoint detectors train the neural network (referred to as the detector neural network) with self-supervision or higher-level supervision/award signal. These conventional approaches can be categorized into three groups:

(1) Detectors (e.g., SuperPoint, UnsuperPoint) that train a neural network (i.e., detector neural network) for keypoint detection with self-supervision from augmentation. These detectors warp each unlabeled image with a random homography and encourage the detector neural network to give repeatable keypoints between the original image and the warped one. It should be noted that this self-supervision does not fully represent the localization capability that the detector neural network described herein can utilize.

(2) Detectors (e.g., Reinforce Feature Points) that aim to improve existing detection networks based on their end-to-end accuracy in localization tasks, with reinforcement learning algorithms.

(3) Detectors (e.g., DISK) that train the neural network with supervision from their localization task performance, with a different reinforcement learning algorithm. These detectors can train a network from scratch.

A technical problem with the conventional approaches of detectors in group (1) is that the detectors cannot learn the stability of keypoints with respect to real-world changes of scenes, viewpoints, and illumination. This is because there is no such change in each image pair in the training data. A technical problem with the conventional approaches of detectors in group (2) is the detectors suffer from a weak training signal, and these detectors have difficulty helping find new keypoints. A technical problem with the conventional approaches of detectors in group (3) is that these detectors utilize ground-truth camera poses and pixel-to-pixel correspondences. As such, these detectors can be trained with a limited group of public datasets, making it unsuitable for improving the network with robotic data in a real deployment.

Implementations of the disclosure address the above-noted technical drawbacks by providing a technique for learning reliable keypoints in situ with introspective self-supervision. The techniques discussed herein for learning reliable keypoints in situ with introspective self-supervision extract dense supervision signals (e.g., keypoint reliability scores) from estimated poses given by a robot's localization system as a feedback loop. The term "in situ" as used herein may refer to being situated in the original place. For example, this may refer to learning keypoints as they are encountered in their original positions while the autonomous system is navigating in real-time. The term "pose" as used herein may refer to a position and orientation of a camera (e.g., on the robot). Implementations herein enable training a neural network for keypoint detection to identify reliable keypoints for a particular scene, thus continually improve robots' localization capability over time.

In implementations herein, a pose graph of VSLAM is leveraged to provide view-overlapped keyframe pairs as training data. The self-supervision comes from the corresponding camera poses from the final output of the robot's localization system. With such supervision, a measurement of reliability (also referred to herein as a keypoint reliability score) is provided for each potential keypoint match. This measurement of reliability can be used to continually train the keypoint detector neural network to identify additional keypoints that do not exist in the original VSLAM, and to identify unreliable keypoints that have inconsistent position between the two keyframes.

Implementations of the disclosure provide a technical advantage of allowing for trained detection neural networks to be generalized to their particular scenes related to a target deployment. As such, implementations herein are well-suited to enable additional scenarios for robot vendors and reduce cost for deploying to new scenarios.

FIG. 1 is a block diagram of an example computing system that may be used to implement learning reliable keypoints in situ with introspective self-supervision, according to implementations of the disclosure. The example computing system 100 may be implemented as a component of another system such as, for example, a mobile device, a wearable device, a laptop computer, a tablet, a desktop computer, a server, etc. In one embodiment, computing system 100 includes or can be integrated within (without limitation): a server-based gaming platform; a game console, including a game and media console; a mobile gaming console, a handheld game console, or an online game console. In some embodiments the computing system 100 is part of a mobile phone, smart phone, tablet computing device or mobile Internet-connected device such as a laptop with low internal storage capacity.

In some embodiments the computing system 100 is part of an Internet-of-Things (IoT) device, which are typically resource-constrained devices. IoT devices may include embedded systems, wireless sensor networks, control systems, automation (including home and building automation), and other devices and appliances (such as lighting fixtures, thermostats, home security systems and cameras, and other home appliances) that support one or more common ecosystems, and can be controlled via devices associated with that ecosystem, such as smartphones and smart speakers.

Computing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the computing system 100 includes or is part of a television or set top box device. In one embodiment, computing system 100 can include, couple with, or be integrated within a self-driving vehicle such as a bus, tractor trailer, car, motor or electric power cycle, plane or glider (or any combination thereof). The self-driving vehicle may use computing system 100 to process the environment sensed around the vehicle.

As illustrated, in one embodiment, computing system 100 may include any number and type of hardware and/or software components, such as (without limitation) graphics processing unit ("GPU", general purpose GPU (GPGPU), or simply "graphics processor") 112, a hardware accelerator 114, central processing unit ("CPU" or simply "application processor") 115, memory 130, network devices, drivers, or the like, as well as input/output (I/O) sources 160, such as touchscreens, touch panels, touch pads, virtual or regular keyboards, virtual or regular mice, ports, connectors, etc. Computing system 100 may include operating system (OS) 110 serving as an interface between hardware and/or physical resources of the computing system 100 and a user. In some implementations, the computing system 100 may include a combination of one or more of the CPU 115, GPU 112, and/or hardware accelerator 114 on a single system on a chip (SoC), or may be without a GPU 112 or visual output (e.g., hardware accelerator 114) in some cases, etc.

As used herein, "hardware accelerator", such as hardware accelerator 114, refers to a hardware device structured to provide for efficient processing. In particular, a hardware accelerator may be utilized to provide for offloading of some processing tasks from a central processing unit (CPU) or other general processor, wherein the hardware accelerator may be intended to provide more efficient processing of the processing tasks than software run on the CPU or other processor. A hardware accelerator may include, but is not limited to, a graphics processing unit (GPU), a vision processing unit (VPU), neural processing unit, AI (Artificial Intelligence) processor, field programmable gate array (FPGA), or application-specific integrated circuit (ASIC).

The GPU 112 (or graphics processor 112), hardware accelerator 114, and/or CPU 115 (or application processor 115) of example computing system 100 may include a model trainer 125 and model executor 105. Although the model trainer 125 and model executor 105 are depicted as part of the CPU 115, in some implementations, the GPU 112 and/or hardware accelerator 114 may include the model trainer 125 and model executor 105.

The example model executor 105 accesses input values (e.g., via an input interface (not shown)), and processes those input values based on a machine learning model stored in a model parameter memory 135 of the memory 130 to produce output values (e.g., via an output interface (not shown)). The input data may be received from one or more data sources (e.g., via one or more sensors, via a network interface, etc.). However, the input data may be received in any fashion such as, for example, from an external device (e.g., via a wired and/or wireless communication channel). In some examples, multiple different types of inputs may be received. In some examples, the input data and/or output data is received via inputs and/or outputs of the system of which the computing system 100 is a component.

In the illustrated example of FIG. 1, the example neural network parameters stored in the model parameter memory 135 are trained by the model trainer 125 such that input training data (e.g., received via a training value interface (not shown)) results in output values based on the training data. In the illustrated example of FIG. 1, the model trainer 125 and/or the model executor 105 utilize a keypoint reliability generator 150 when processing the model during training and/or inference.

The example model executor 105, the example model trainer 125, and the example keypoint reliability generator 150 are implemented by one or more logic circuits such as, for example, hardware processors. In some examples, one or more of the example model executor 105, the example model trainer 125, and the example keypoint reliability generator 150 may be implemented by a same hardware component (e.g., a same logic circuit) or by different hardware components (e.g., different logic circuits, different computing systems, etc.). However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

In examples disclosed herein, the example model executor 105 executes a machine learning model. The example machine learning model may be implemented using a neural network (e.g., a feedforward neural network). However, any other past, present, and/or future machine learning topology(ies) and/or architecture(s) may additionally or alternatively be used such as, for example, a CNN.

To execute a model, the example model executor 105 accesses input data. The example model executor 105 applies the model (defined by the model parameters (e.g., neural network parameters including weight and/or activations) stored in the model parameter memory 135) to the input data.

The example model parameter memory 135 of the illustrated example of FIG. 1 is implemented by any memory, storage device and/or storage disc for storing data such as, for example, flash memory, magnetic media, optical media, etc. Furthermore, the data stored in the example model parameter memory 135 may be in any data format such as, for example, binary data, comma delimited data, tab delimited data, structured query language (SQL) structures, etc. While in the illustrated example the model parameter memory 135 is illustrated as a single element, the model parameter memory 135 and/or any other data storage elements described herein may be implemented by any number and/or type(s) of memories. In the illustrated example of FIG. 1, the example model parameter memory 135 stores model weighting parameters that are used by the model executor 105 to process inputs for generation of one or more outputs as output data.

In examples disclosed herein, the output data may be information that classifies the received input data (e.g., as determined by the model executor 105). However, any other type of output that may be used for any other purpose may additionally or alternatively be used. In examples disclosed herein, the output data may be output by an input/output (I/O) source 160 that displays the output values. However, in some examples, the output data may be provided as output values to another system (e.g., another circuit, an external system, a program executed by the computing system 100, etc.). In some examples, the output data may be stored in a memory.

The example model trainer 125 of the illustrated example of FIG. 1 compares expected outputs (e.g., received as training values at the computing system 100) to outputs produced by the example model executor 105 to determine an amount of training error, and updates the model parameters (e.g., model parameter memory 135) based on the amount of error. After a training iteration, the amount of error is evaluated by the model trainer 125 to determine whether to continue training. In examples disclosed herein, errors are identified when the input data does not result in an expected output. That is, error is represented as a number of incorrect outputs given inputs with expected outputs. However, any other approach to representing error may additionally or alternatively be used such as, for example, a percentage of input data points that resulted in an error.

The example model trainer 125 determines whether the training error is less than a training error threshold. If the training error is less than the training error threshold, then the model has been trained such that it results in a sufficiently low amount of error, and no further training is pursued. In examples disclosed herein, the training error threshold is ten errors. However, any other threshold may additionally or alternatively be used. Moreover, other types of factors may be considered when determining whether model training is complete. For example, an amount of training iterations performed and/or an amount of time elapsed during the training process may be considered.

The training data that is utilized by the model trainer 125 includes example inputs (corresponding to the input data expected to be received), as well as expected output data. In examples disclosed herein, the example training data is provided to the model trainer 125 to enable the model trainer 125 to determine an amount of training error.

In examples disclosed herein, the example model trainer 125 and/or the example model executor 105 utilizes the keypoint reliability generator 150 to implement learning reliable keypoints in situ with introspective self-supervision. As noted above, implementations of the disclosure provide a technique for learning reliable keypoints in situ with introspective self-supervision. The keypoint reliability generator 150 may provide for this learning reliable keypoints in situ with introspective self-supervision, as described here. In one implementation, the keypoint reliability generator 150 can extract dense supervision signals from estimated poses generated by a robot's localization system as a feedback loop (e.g., during an inference stage performed by model executor 105). Implementations herein enable training a neural network (e.g., via model trainer 125) for keypoint detection to identify reliable keypoints for a particular scene, thus continually improve robots' localization capability over time.

In implementations herein, the keypoint reliability generator 150 can leverage a pose graph of VSLAM to provide view-overlapped keyframe pairs as training data. The self-supervision comes from the corresponding camera poses from the final output of the robot's localization system. With such supervision, a measurement of reliability (also referred to herein as a keypoint reliability score) is provided for each potential keypoint match. This measurement of reliability can be used to continually train the keypoint detector neural network to identify additional keypoints that do not exist in the original VSLAM, and to identify unreliable keypoints that have inconsistent position between the two keyframes.

As discussed above, to train a model, such as a machine learning model utilizing a neural network, the example model trainer 125 trains a machine learning model using the keypoint reliability generator 150. Further discussion and detailed description of the model trainer 125 and keypoint reliability generator 150 are provided below with respect to FIGS. 2-12.

The example I/O source 160 of the illustrated example of FIG. 1 enables communication of the model stored in the model parameter memory 135 with other computing systems. In some implementations, the I/O source(s) 160 may include, at but is not limited to, a network device, a microprocessor, a camera, a robotic eye, a speaker, a sensor, a display screen, a media player, a mouse, a touch-sensitive device, and so on. In this manner, a central computing system (e.g., a server computer system) can perform training of the model and distribute the model to edge devices for utilization (e.g., for performing inference operations using the model). In examples disclosed herein, the I/O source 160 is implemented using an Ethernet network communicator. However, any other past, present, and/or future type(s) of communication technologies may additionally or alternatively be used to communicate a model to a separate computing system.

While an example manner of implementing the computing system 100 is illustrated in FIG. 1, one or more of the elements, processes and/or devices illustrated in FIG. 1 may be combined, divided, re-arranged, omitted, eliminated and/or implemented in any other way. Further, the example model executor 105, the example model trainer 125, the example keypoint reliability generator 150, the I/O source(s) 160, and/or, more generally, the example computing system 100 of FIG. 1 may be implemented by hardware, software, firmware and/or any combination of hardware, software and/or firmware. Thus, for example, any of the example model executor 105, the example model trainer 125, the example keypoint reliability generator 150, the example I/O source(s) 160, and/or, more generally, the example computing system 100 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

In some implementations of the disclosure, a software and/or firmware implementation of at least one of the example model executor 105, the example model trainer 125, the example keypoint reliability generator 150, the example I/O source(s) 160, and/or, more generally, the example computing system 100 of FIG. 1 be provided. Such implementations can include a non-transitory computer readable storage device or storage disk such as a memory, a digital versatile disk (DVD), a compact disk (CD), a Blu-ray disk, etc. including the software and/or firmware. Further still, the example computing system 100 of FIG. 1 may include one or more elements, processes and/or devices in addition to, or instead of, those illustrated in FIG. 1, and/or may include more than one of any or all of the illustrated elements, processes, and devices. As used herein, the phrase "in communication," including variations thereof, encompasses direct communication and/or indirect communication through one or more intermediary components, and does not utilize direct physical (e.g., wired) communication and/or constant communication, but rather additionally includes selective communication at periodic intervals, scheduled intervals, aperiodic intervals, and/or one-time events.

Machine Learning Overview

A machine learning algorithm is an algorithm that can learn based on a set of data. Embodiments of machine learning algorithms can be designed to model high-level abstractions within a data set. For example, image recognition algorithms can be used to determine which of several categories to which a given input belong; regression algorithms can output a numerical value given an input; and pattern recognition algorithms can be used to generate translated text or perform text to speech and/or speech recognition.

An example type of machine learning algorithm is a neural network. There are many types of neural networks; a simple type of neural network is a feedforward network. A feedforward network may be implemented as an acyclic graph in which the nodes are arranged in layers. Typically, a feedforward network topology includes an input layer and an output layer that are separated by at least one hidden layer. The hidden layer transforms input received by the input layer into a representation that is useful for generating output in the output layer. The network nodes are fully connected via edges to the nodes in adjacent layers, but there are no edges between nodes within each layer. Data received at the nodes of an input layer of a feedforward network are propagated (i.e., "fed forward") to the nodes of the output layer via an activation function that calculates the states of the nodes of each successive layer in the network based on coefficients ("weights") respectively associated with each of the edges connecting the layers. Depending on the specific model being represented by the algorithm being executed, the output from the neural network algorithm can take various forms.

Before a machine learning algorithm can be used to model a particular problem, the algorithm is trained using a training data set. Training a neural network involves selecting a network topology, using a set of training data representing a problem being modeled by the network, and adjusting the weights until the network model performs with a minimal error for all instances of the training data set. For example, during a supervised learning training process for a neural network, the output produced by the network in response to the input representing an instance in a training data set is compared to the "correct" labeled output for that instance, an error signal representing the difference between the output and the labeled output is calculated, and the weights associated with the connections are adjusted to minimize that error as the error signal is backward propagated through the layers of the network. The network is considered "trained" when the errors for each of the outputs generated from the instances of the training data set are minimized.

The accuracy of a machine learning algorithm can be affected significantly by the quality of the data set used to train the algorithm. The training process can be computationally intensive and may require a significant amount of time on a conventional general-purpose processor. Accordingly, parallel processing hardware is used to train many types of machine learning algorithms. This is particularly useful for optimizing the training of neural networks, as the computations performed in adjusting the coefficients in neural networks lend themselves naturally to parallel implementations. Specifically, many machine learning algorithms and software applications have been adapted to make use of the parallel processing hardware within general-purpose graphics processing devices.

Figure 2:
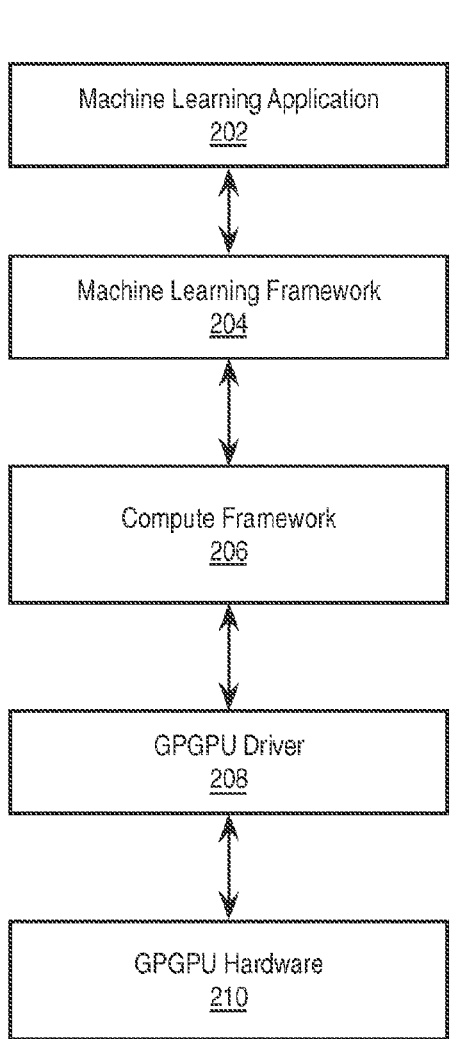
FIG. 2 illustrates a machine learning software stack, according to an embodiment.

FIG. 2 is a generalized diagram of a machine learning software stack 200. A machine learning application 202 can be configured to train a neural network using a training dataset or to use a trained deep neural network to implement machine intelligence. The machine learning application 202 can include training and inference functionality for a neural network and/or specialized software that can be used to train a neural network before deployment. The machine learning application 202 can implement any type of machine intelligence including but not limited to image recognition, mapping and localization, autonomous navigation, speech synthesis, medical imaging, or language translation.

Hardware acceleration for the machine learning application 202 can be enabled via a machine learning framework 204. The machine learning framework 204 can provide a library of machine learning primitives. Machine learning primitives are basic operations that are commonly performed by machine learning algorithms. Without the machine learning framework 204, developers of machine learning algorithms would have to create and optimize the main computational logic associated with the machine learning algorithm, then re-optimize the computational logic as new parallel processors are developed. Instead, the machine learning application can be configured to perform the computations using the primitives provided by the machine learning framework 204. Example primitives include tensor convolutions, activation functions, and pooling, which are computational operations that are performed while training a convolutional neural network (CNN). The machine learning framework 204 can also provide primitives to implement basic linear algebra subprograms performed by many machine-learning algorithms, such as matrix and vector operations.

The machine learning framework 204 can process input data received from the machine learning application 202 and generate the appropriate input to a compute framework 206. The compute framework 206 can abstract the underlying instructions provided to the GPGPU driver 208 to enable the machine learning framework 204 to take advantage of hardware acceleration via the GPGPU hardware 210 without requiring the machine learning framework 204 to have intimate knowledge of the architecture of the GPGPU hardware 210. Additionally, the compute framework 206 can enable hardware acceleration for the machine learning framework 204 across a variety of types and generations of the GPGPU hardware 210.

Machine Learning Neural Network Implementations

The computing architecture provided by embodiments described herein can be configured to perform the types of parallel processing that is particularly suited for training and deploying neural networks for machine learning. A neural network can be generalized as a network of functions having a graph relationship. As is known in the art, there are a variety of types of neural network implementations used in machine learning. One example type of neural network is the feedforward network, as previously described.

A second example type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for an RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described below present example feedforward, CNN, and RNN networks, as well as describe a general process for respectively training and deploying each of those types of networks. It can be understood that these descriptions are example and non-limiting as to any specific embodiment described herein and the concepts illustrated can be applied generally to deep neural networks and machine learning techniques in general.

The example neural networks described above can be used to perform deep learning. Deep learning is machine learning using deep neural networks. The deep neural networks used in deep learning are artificial neural networks composed of multiple hidden layers, as opposed to shallow neural networks that include a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models can be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the sought-after output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 3A:
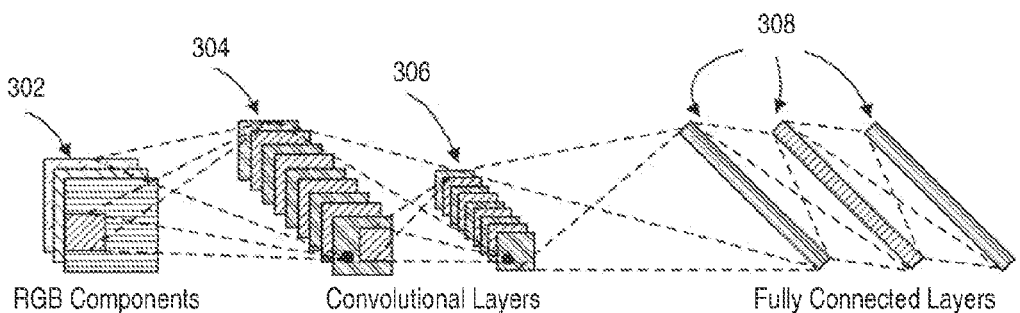
FIGS. 3A-3B illustrate layers of example deep neural networks.
Figure 3B:
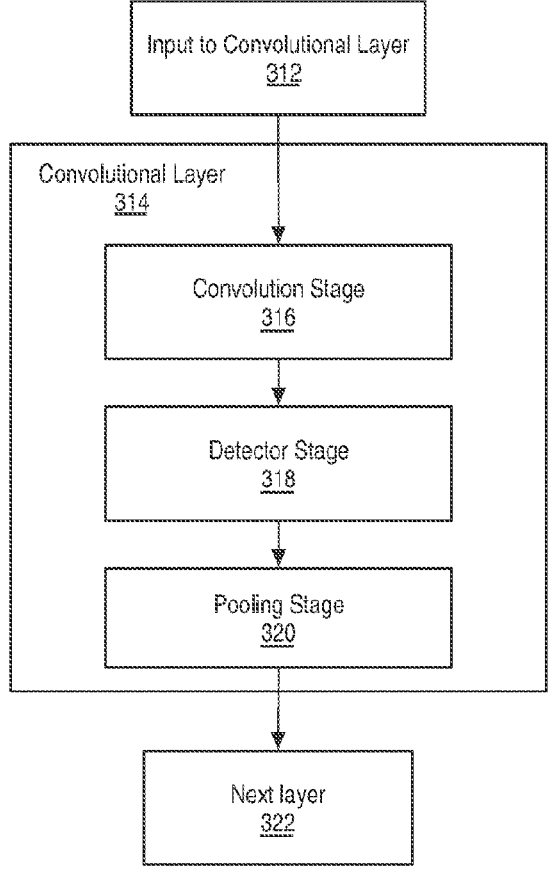

FIGS. 3A-3B illustrate an example convolutional neural network. FIG. 3A illustrates various layers within a CNN. As shown in FIG. 3A, an example CNN used to model image processing can receive input 302 describing the red, green, and blue (RGB) components of an input image. The input 302 can be processed by multiple convolutional layers (e.g., first convolutional layer 304, second convolutional layer 306). The output from the multiple convolutional layers may optionally be processed by a set of fully connected layers 308. Neurons in a fully connected layer have full connections to all activations in the previous layer, as previously described for a feedforward network. The output from the fully connected layers 308 can be used to generate an output result from the network. The activations within the fully connected layers 308 can be computed using matrix multiplication instead of convolution. Not all CNN implementations make use of fully connected layers 308. For example, in some implementations the second convolutional layer 306 can generate output for the CNN.

The convolutional layers are sparsely connected, which differs from traditional neural network configuration found in the fully connected layers 308. Traditional neural network layers are fully connected, such that every output unit interacts with every input unit. However, the convolutional layers are sparsely connected because the output of the convolution of a field is input (instead of the respective state value of each of the nodes in the field) to the nodes of the subsequent layer, as illustrated. The kernels associated with the convolutional layers perform convolution operations, the output of which is sent to the next layer. The dimensionality reduction performed within the convolutional layers is one aspect that enables the CNN to scale to process large images.

FIG. 3B illustrates example computation stages within a convolutional layer of a CNN. Input to a convolutional layer 312 of a CNN can be processed in three stages of a convolutional layer 314. The three stages can include a convolution stage 316, a detector stage 318, and a pooling stage 320. The convolutional layer 314 can then output data to a successive convolutional layer. The final convolutional layer of the network can generate output feature map data or provide input to a fully connected layer, for example, to generate a classification value for the input to the CNN.

In the convolution stage 316 performs several convolutions in parallel to produce a set of linear activations. The convolution stage 316 can include an affine transformation, which is any transformation that can be specified as a linear transformation plus a translation. Affine transformations include rotations, translations, scaling, and combinations of these transformations. The convolution stage computes the output of functions (e.g., neurons) that are connected to specific regions in the input, which can be determined as the local region associated with the neuron. The neurons compute a dot product between the weights of the neurons and the region in the local input to which the neurons are connected. The output from the convolution stage 316 defines a set of linear activations that are processed by successive stages of the convolutional layer 314.

The linear activations can be processed by a detector stage 318. In the detector stage 318, each linear activation is processed by a non-linear activation function. The non-linear activation function increases the nonlinear properties of the overall network without affecting the receptive fields of the convolution layer. Several types of non-linear activation functions may be used. One particular type is the rectified linear unit (ReLU), which uses an activation function defined as $f(x)=\max(0,x)$, such that the activation is thresholded at zero.

The pooling stage 320 uses a pooling function that replaces the output of the second convolutional layer 306 with a summary statistic of the nearby outputs. The pooling function can be used to introduce translation invariance into the neural network, such that small translations to the input do not change the pooled outputs. Invariance to local translation can be useful in scenarios where the presence of a feature in the input data is weighted more heavily than the precise location of the feature. Various types of pooling functions can be used during the pooling stage 320, including max pooling, average pooling, and 12-norm pooling. Additionally, some CNN implementations do not include a pooling stage. Instead, such implementations substitute and additional convolution stage having an increased stride relative to previous convolution stages.

The output from the convolutional layer 314 can then be processed by the next layer 322. The next layer 322 can be an additional convolutional layer or one of the fully connected layers 308. For example, the first convolutional layer 304 of FIG. 3A can output to the second convolutional layer 306, while the second convolutional layer can output to a first layer of the fully connected layers 308.

Figure 4:
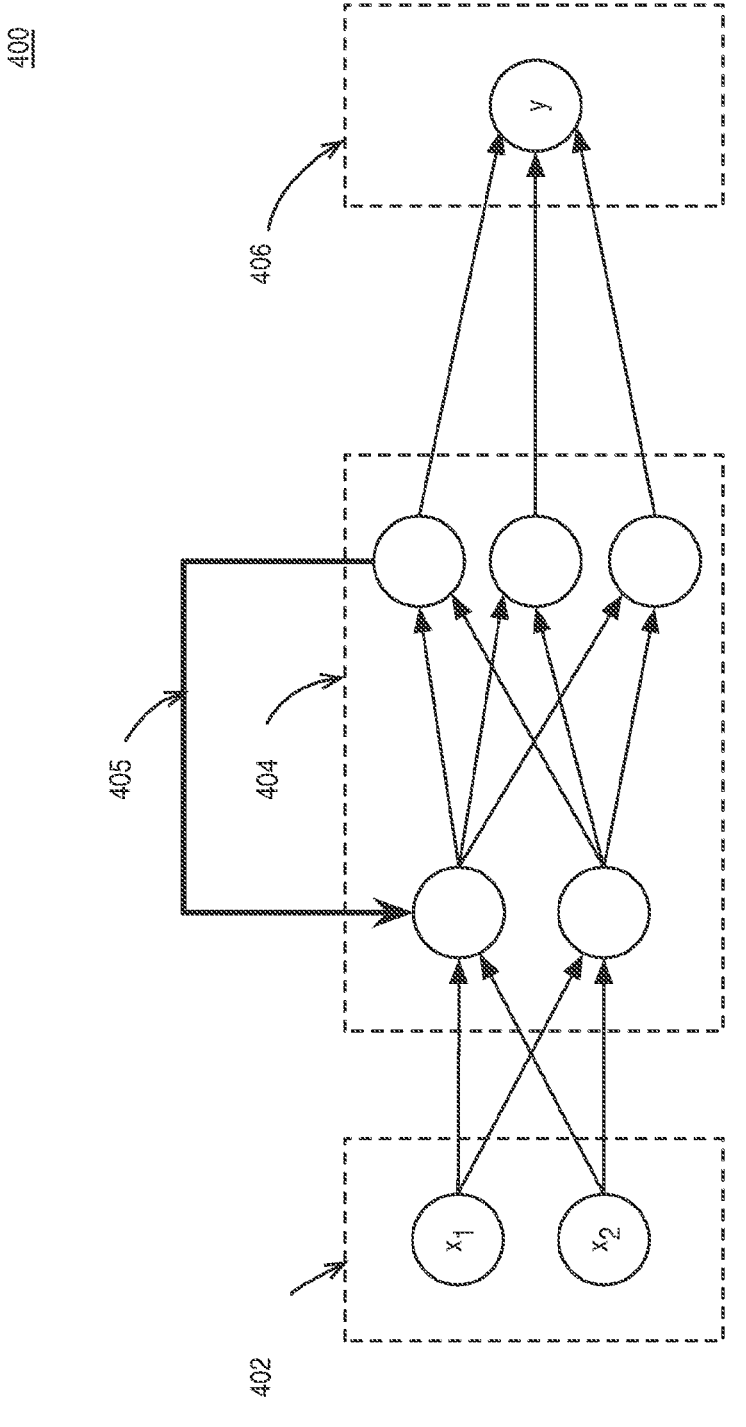
FIG. 4 illustrates an example recurrent neural network.

FIG. 4 illustrates an example recurrent neural network. In a recurrent neural network (RNN), the previous state of the network influences the output of the current state of the network. RNNs can be built in a variety of ways using a variety of functions. The use of RNNs generally revolves around using mathematical models to predict the future based on a prior sequence of inputs. For example, an RNN may be used to perform statistical language modeling to predict an upcoming word given a previous sequence of words. The illustrated RNN 400 can be described as having an input layer 402 that receives an input vector, hidden layers 404 to implement a recurrent function, a feedback mechanism 405 to enable a 'memory' of previous states, and an output layer 406 to output a result. The RNN 400 operates based on time-steps. The state of the RNN at a given time step is influenced based on the previous time step via the feedback mechanism 405. For a given time step, the state of the hidden layers 404 is defined by the previous state and the input at the current time step. An initial input $(x_1)$ at a first-time step can be processed by the hidden layer 404. A second input $(x_2)$ can be processed by the hidden layer 404 using state information that is determined during the processing of the initial input $(x_1)$. A given state can be computed as $S_t=f(Ux_t+Ws_{t-1})$, where U and W are parameter matrices. The function $f$ is generally a nonlinearity, such as the hyperbolic tangent function (Tanh) or a variant of the rectifier function $f(x)=\max(0,x)$. However, the specific mathematical function used in the hidden layers 404 can vary depending on the specific implementation details of the RNN 400.

In addition to the basic CNN and RNN networks described, variations on those networks may be enabled. One example RNN variant is the long short-term memory (LSTM) RNN. LSTM RNNs are capable of learning long-term dependencies that may be utilized for processing longer sequences of language. A variant on the CNN is a convolutional deep belief network, which has a structure similar to a CNN and is trained in a manner similar to a deep belief network. A deep belief network (DBN) is a generative neural network that is composed of multiple layers of stochastic (random) variables. DBNs can be trained layer-by-layer using greedy unsupervised learning. The learned weights of the DBN can then be used to provide pre-train neural networks by determining an optimized initial set of weights for the neural network.

Figure 5:
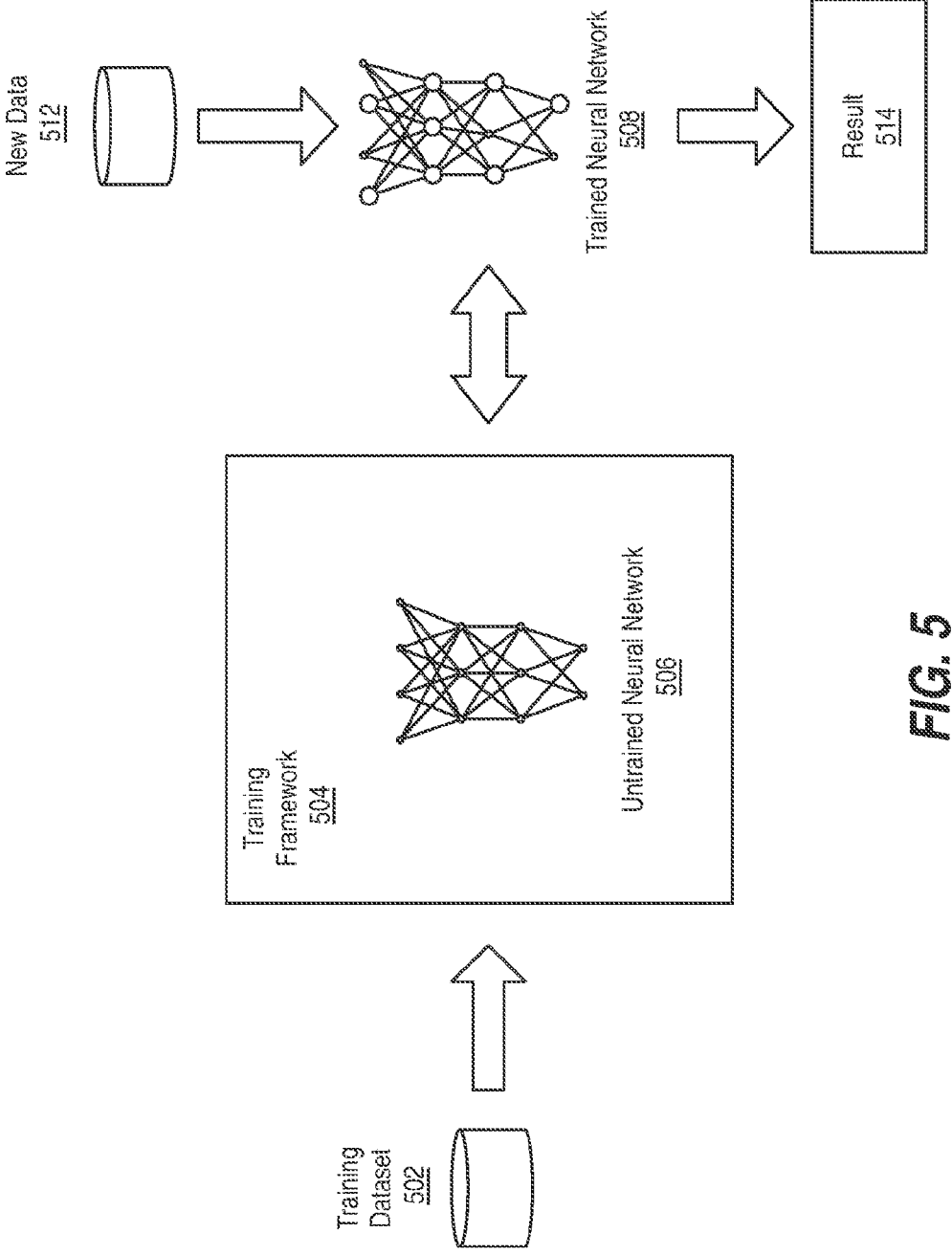
FIG. 5 illustrates training and deployment of a deep neural network.

FIG. 5 illustrates training and deployment of a deep neural network. Once a given network has been structured for a task the neural network is trained using a training dataset 502. Various training frameworks have been developed to enable hardware acceleration of the training process. For example, the machine learning framework 204 of FIG. 2 may be configured as a training framework 504. The training framework 504 can hook into an untrained neural network 506 and enable the untrained neural network to be trained using the parallel processing resources described herein to generate a trained neural network 508. To start the training process the initial weights may be chosen randomly or by pre-training using a deep belief network. The training cycle then be performed in either a supervised or unsupervised manner.

Supervised learning is a learning method in which training is performed as a mediated operation, such as when the training dataset 502 includes input paired with the sought-after output for the input, or where the training dataset includes input having known output and the output of the neural network is manually graded. The network processes the inputs and compares the resulting outputs against a set of expected or sought-after outputs. Errors are then propagated back through the system. The training framework 504 can adjust to adjust the weights that control the untrained neural network 506. The training framework 504 can provide tools to monitor how well the untrained neural network 506 is converging towards a model suitable to generating correct answers based on known input data. The training process occurs repeatedly as the weights of the network are adjusted to refine the output generated by the neural network. The training process can continue until the neural network reaches a statistically relevant accuracy associated with a trained neural network 508. The trained neural network 508 can then be deployed to implement any number of machine learning operations to generate an inference result 514 based on input of new data 512.

Unsupervised learning is a learning method in which the network attempts to train itself using unlabeled data. Thus, for unsupervised learning the training dataset 502 can include input data without any associated output data. The untrained neural network 506 can learn groupings within the unlabeled input and can determine how individual inputs are related to the overall dataset. Unsupervised training can be used to generate a self-organizing map, which is a type of trained neural network 508 capable of performing operations useful in reducing the dimensionality of data. Unsupervised training can also be used to perform anomaly detection, which allows the identification of data points in an input dataset that deviate from the normal patterns of the data.

Variations on supervised and unsupervised training may also be employed. Semi-supervised learning is a technique in which in the training dataset 502 includes a mix of labeled and unlabeled data of the same distribution. Incremental learning is a variant of supervised learning in which input data is continuously used to further train the model. Incremental learning enables the trained neural network 508 to adapt to the new data 512 without forgetting the knowledge instilled within the network during initial training.

Whether supervised or unsupervised, the training process for particularly deep neural networks may be too computationally intensive for a single compute node. Instead of using a single compute node, a distributed network of computational nodes can be used to accelerate the training process.
Example Machine Learning Applications Machine learning can be applied to solve a variety of technological problems, including but not limited to computer vision, autonomous driving and navigation, speech recognition, and language processing. Computer vision has traditionally been an active research area for machine learning applications. Applications of computer vision range from reproducing human visual abilities, such as recognizing faces, to creating new categories of visual abilities. For example, computer vision applications can be configured to recognize sound waves from the vibrations induced in objects visible in a video. Parallel processor accelerated machine learning enables computer vision applications to be trained using significantly larger training dataset than previously feasible and enables inferencing systems to be deployed using low power parallel processors.

Parallel processor accelerated machine learning has autonomous driving applications including lane and road sign recognition, obstacle avoidance, navigation, and driving control. Accelerated machine learning techniques can be used to train driving models based on datasets that define the appropriate responses to specific training input. The parallel processors described herein can enable rapid training of the increasingly complex neural networks used for autonomous driving solutions and enables the deployment of low power inferencing processors in a mobile platform suitable for integration into autonomous vehicles.

Parallel processor accelerated deep neural networks have enabled machine learning approaches to automatic speech recognition (ASR). ASR includes the creation of a function that computes the most probable linguistic sequence given an input acoustic sequence. Accelerated machine learning using deep neural networks have enabled the replacement of the hidden Markov models (HMMs) and Gaussian mixture models (GMMs) previously used for ASR.

Parallel processor accelerated machine learning can also be used to accelerate natural language processing. Automatic learning procedures can make use of statistical inference algorithms to produce models that are robust to erroneous or unfamiliar input. Example natural language processor applications include automatic machine translation between human languages.

The parallel processing platforms used for machine learning can be divided into training platforms and deployment platforms. Training platforms are generally highly parallel and include optimizations to accelerate multi-GPU single node training and multi-node, multi-GPU training, while deployed machine learning (e.g., inferencing) platforms generally include lower power parallel processors suitable for use in products such as cameras, autonomous robots, and autonomous vehicles.
Learning Reliable Keypoints In Situ With Introspective Self-Supervision As discussed above, implementations of the disclosure provide for learning reliable keypoints in situ with introspective self-supervision. In one implementation, the keypoint reliability generator 150 described with respect to FIG. 1 provides for the learning reliable keypoints in situ with introspective self-supervision, as described herein. The following description and figures detail such implementation.

As previously discussed, an example application for machine learning models is in the technology of autonomous robot localization. One technique used in robot localization is VSLAM. When implementing VSLAM, the robustness and accuracy of the robot's navigation is based on the number and quality of matchable keypoints from each image. A "keypoint" as discussed herein may refer to an interesting point or object in an image. Keypoints are spatial locations, or points in the image that define what is interesting and/or what stands out in the image. In some examples, keypoints may be the corner of a doorframe, a wall, a stationary object such as a table or a desk, a post, a building, a distinct landform, and so on. In VSLAM keypoints are detected in an image to aid in mapping an environment for navigation purposes. As such, keypoint detection is an aspect of robot localization techniques, such as VSLAM, and ML/AI models are often utilized to aid in keypoint detection.

For example, recent research shows that deep learning (DL)-based keypoint detection outperforms traditional ones for SLAM. Moreover, DL-based keypoint detection can be tuned to the specific environment the robots are working in. The challenge is how to create supervision for the training with unlabeled images, especially when the robot is deployed.

Implementations of the disclosure provide a technique for learning reliable keypoints in situ with introspective self-supervision. The technique discussed herein for learning reliable keypoints in situ with introspective self-supervision extracts dense supervision signals (e.g., keypoint reliability scores) from estimated poses given by a robot's localization system as a feedback loop. Implementations herein enable training a neural network for keypoint detection to identify reliable keypoints for a particular scene, thus continually improve robots' localization capability over time.

In implementations herein, a pose graph of VSLAM is leveraged to provide view-overlapped keyframe pairs as training data. The self-supervision comes from the corresponding camera poses from the final output of the robot's localization system. With such supervision, a measurement of reliability (also referred to herein as a keypoint reliability score) is provided for each potential keypoint match. This measurement of reliability can be used to continually train the keypoint detector neural network to identify additional keypoints that do not exist in the original VSLAM, and to identify unreliable keypoints that have inconsistent position between the two keyframes.

Figure 6:
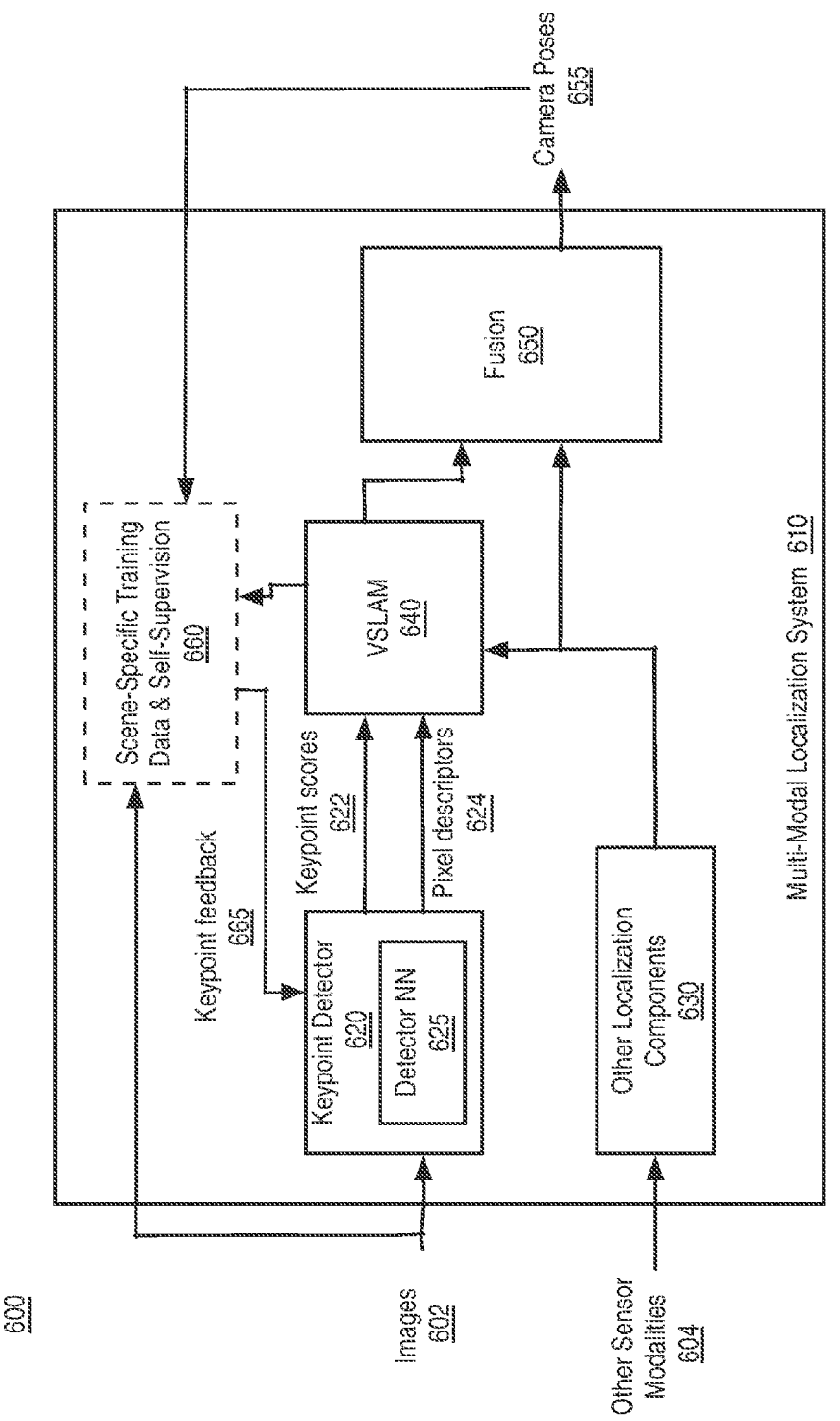
FIG. 6 is a block diagram depicting an example autonomous navigational system for learning reliable keypoints in situ with introspective self-supervision of implementations of the disclosure.

FIG. 6 is a block diagram depicting an example autonomous navigational system 600 for learning reliable keypoints in situ with introspective self-supervision of implementations of the disclosure. In one implementation, keypoint reliability generator 150 described with respect to FIG. 1, can be implemented using autonomous navigational system 600 (may be referred to herein a system 600) as part of training an ML model or as part of executing an ML model, for example. In one implementation, system 600 can be a robot or any other platform deploying an autonomous machine (e.g., an autonomous vehicle, etc.). In implementations herein, system 600 can include any system that utilizes VSLAM.

As shown in FIG. 6, system 600 (depicts a multi-modal localization system 610. In one implementation, the multi-modal localization system 610 may be part of a parallel processing platforms used for machine learning. In implementations herein, multi-modal localization system 610, when deployed, can be part of a robot and/or an autonomous system. The parallel processing platform may be divided into training platforms and deployment platforms. Training platforms are generally highly parallel and include optimizations to accelerate multi-GPU single node training and multi-node, multi-GPU training, while deployed machine learning (e.g., inferencing) platforms generally include lower power parallel processors suitable for use in products such as cameras, autonomous robots, and autonomous vehicles.

In implementations herein, scene-specific landmarks can be useful in localization tasks perform by system 600, especially in feature-poor or highly dynamic environments. In some implementations, there are often chances to find more landmarks and to discriminate unreliable landmarks (e.g., those on moving/movable objects, or those lacking correspondence in real world) even when VSLAM is working. As such, the multi-modal localization system 610 is implemented to provide reliable pose estimates.

In one implementation, multi-modal localization system 610 may include a keypoint detector 620, other localization components 630, VSLAM 640, and fusion 650. The keypoint detector 620 may include hardware (e.g., circuitry, dedicated logic, programmable logic, etc.), software (such as instructions run on a processing device), or a combination thereof utilized to perform a keypoint detection and matching process. In one implementation, the keypoint detector 620 includes a detector neural network 625 trained and deployed to perform keypoint detection in image data of images 602 received at the multi-modal localization system 610. In one implementation, the detector neural network 625 is a CNN-based neural network.

Multi-modal localization system 610 may include other localization components 630 such as, but not limited to wheel odometry, laser SLAM, GPS, HD map, semantic landmark detection, and so on. The other localization components 630 may process input data received from other sensor modalities 604, such as LIDAR, GPS, speed sensors, directional sensors, and so on. Outputs from the keypoint detector 620, including keypoint scores 622 and pixel descriptors 624, as well as output from the other localization components 630 are routed to the VSLAM 640. VSLAM 640 processes the received inputs to triangulate their 3D positions and approximate a camera pose. VSLAM 640 performs operations to map the surroundings of system 600 in relation to its own location for the purposes of navigation. The proposed triangulated 3D position generated by VSLAM 640 is passed to fusion 650, as well as to a scene-specific training data and self-supervision component 660.

Fusion 650 receives input from the VSLAM 640 as well as from the other localization components 630 and merges these inputs to generate a final camera pose 655 for the system 600. This camera pose is utilized for navigation purposes of system 600. IN implementations herein, the camera pose is also passed to the scene-specific training data and self-supervision component 660. The term "scene-specific" as utilized herein may refer to a current environment that the system 600 is operating in. In some implementations, scene-specific refers to a current view provided in an image captured by system (e.g., images 602).

Implementations herein utilize scene-specific training data and self-supervision component 660 to continually improve the keypoint detector 620 (and the detector neural network 625) with the data generated in a real-time deployment of system 600 (i.e., input images 602, VSLAM 640 output, camera pose 655). When system 600 is operational, functional, and in use, implementations create keypoints (e.g., landmarks) within the system 600 (e.g., on the system 600 or moved to another edge server (if there are other robots, this one could be used to help train those other robots)) and provide improved clarity when environmental conditions change so the system 600 can learn those changes on-the-fly (e.g., in real-time during operation).

In implementations herein, system 600 may include prior information regarding coordinates of keypoints in its surrounding environment (e.g., based on previous information regarding location of some keypoints in the environment). While the system 600 is moving and having some prior information of the coordinates of some of the structures, it is generating the keypoints (e.g., to be used as training data at scene-specific training data and self-supervision component 660) in an unsupervised manner on its own.

In one implementation, the scene-specific training data and self-supervision component 660 may include hardware (e.g., circuitry, dedicated logic, programmable logic, etc.), software (such as instructions run on a processing device), or a combination thereof utilized to leverage a pose graph generated by VSLAM 640 to provide view-overlapped keyframe pairs as training data. The scene-specific training data and self-supervision component 660 may also utilize self-supervision (e.g., supervision signals) for training purposes. The supervision signals are derived from the corresponding camera poses from the final output of the camera pose 655 of the multi-modal localization system 610.

In implementations herein, the supervision signals may include a measurement of reliability for each potential keypoint match. As previously discussed, the detector neural network 625 can identify a keypoint. Based on the camera pose 655 generation, the scene-specific training data and self-supervision component 660 identifies the location of that keypoint (e.g., coordinate) and can cross-check this coordinate with its previously saved coordinates corresponding to that specific landmark. As a result, the scene-specific training data and self-supervision component 660 can correct itself, using keypoint feedback 665, while system 600 is operating by using prior information known to system 600 regarding scene-specific coordinates. In one implementation, keypoint feedback 665 can be an inverse reliability score, which is discussed in further detail below. In one implementation, the keypoint reliability score can be provided as metadata in the keypoint feedback 665.

In one implementation, during operation of system 600, an image 602 can arrive as input to keypoint detector 620. Keypoint detector 620 can apply detector neural network 625 to detect one or more keypoints in the image 602. Keypoint detector 620 further provides a keypoint score 622 (also referred to herein a keypoint reliability score) with pixel descriptors of the identified keypoint to the VSLAM 640. The keypoint score 622 indicates an importance level and/or an accuracy level of the detected keypoint and is based on the self-supervised information discussed above. For example, factors affecting the keypoint score 622 include where it is known if the keypoint actually exists in this location (e.g., scene). If it is known to exist, then the keypoint score 622 is increased. If the keypoint is known to not be located in the scene, then the keypoint score 622 is decreased (or the keypoint is removed altogether). In one implementation, the keypoint score 622 is a higher value on a spectrum of values responsive to a coordinate of the keypoint being previously identified as a known keypoint, and the keypoint score 622 is smaller value on the spectrum of values responsive to the coordinate of the keypoint not being previously identified as a known keypoint. The keypoint score 622 can be utilized by VSLAM 640 to compute the camera pose 655 in a more accurate manner (e.g., more reliably). System 600 may cycle through the above process repeatedly with each input image and/or detected keypoint encountered during operation.

When the system 600 creates its path, there are often errors such as sensor errors, errors in an inertial measurement unit (IMU), and so on. As a result, the pose generation of camera pose 655 may not be exact. By providing for the scene-specific training data and self-supervision, implementations can reduce the errors generated by system 600 when creating its path. For example, whenever system 600 encounters a specific landmark, it may already know offline the coordinates for that specific landmark. However, there may be an error in the camera pose 655 generated by multi-modal localization system 610. Implementations herein can correct the error during operation of system 600 by utilizing the techniques described above and herein (e.g., keypoint reliability score can be used to continually train the keypoint detector 620 to locate additional keypoints that exist in the original VSLAM 640). In implementations herein, the keypoint reliability score generated during operation of system 600 can be utilized for training purposes during operation of system 600 and/or offline from system 600.

Figure 7:
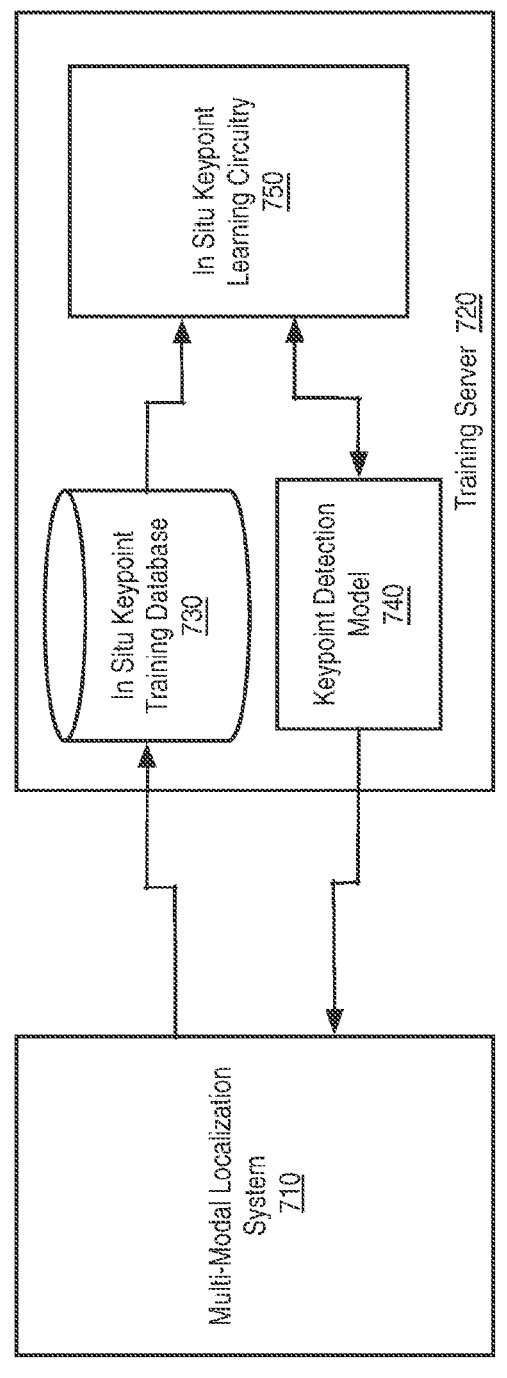
FIG. 7 is a block diagram depicting a training system executed on a cloud or edge server for learning reliable keypoints in situ with introspective self-supervision, in accordance with implementations of the disclosure.

FIG. 7 is a block diagram depicting a training system 700 executed on a cloud or edge server for learning reliable keypoints in situ with introspective self-supervision, in accordance with implementations of the disclosure. In one implementation, system 700 includes one or more multi-modal localization systems 710 communicably coupled to a training server 720. In one implementation, multi-modal localization system 710 is the same as multi-modal localization system 610 described with respect to FIG. 6. In implementations herein, there can be more than one multi-modal localization system 710 providing training data to training server 720. In one implementation, keypoint reliability generator 150 described with respect to FIG. 1 operates as part of multi-modal localization system 710, for example. In one implementation, training server 720 is separate from multi-modal localization system 710 and may be located on a cloud server and/or on an edge server.

Multi-modal localization system 710 may operate to generate a new edge in a pose graph using VSLAM, for example. Upon generation of the new edge, the multi-modal localization system 710 may retrieve images of two keyframes (e.g., image frames of the scene) connected by this edge, calculate a fundamental matrix for the two keyframes, and then save the image paid and fundamental matrix into the in situ keypoint training database 730 of training server 720.

The in situ keypoint learning circuitry 750 of training server 720 may periodically invoke a training process to train a keypoint detection model 740. During this training process, the in situ keypoint learning circuitry 750 can select a batch of image pairs (randomly or with importance sampling). The image pairs should have common visual features. In implementations herein, the pose graph of keyframe-based VSLAM system can be leveraged as follows. In a pose graph, each edge connects the poses of two keyframes which have observed common landmarks, either being consecutive keyframes, or connected by a loop closure. These keyframe pairs can be utilized for training data for keypoint detectors, as they can tell both short-term and long-term scene dynamics, and the information redundancy has been restrained by the keyframe selection mechanism in the VSLAM system.

Figure 8:
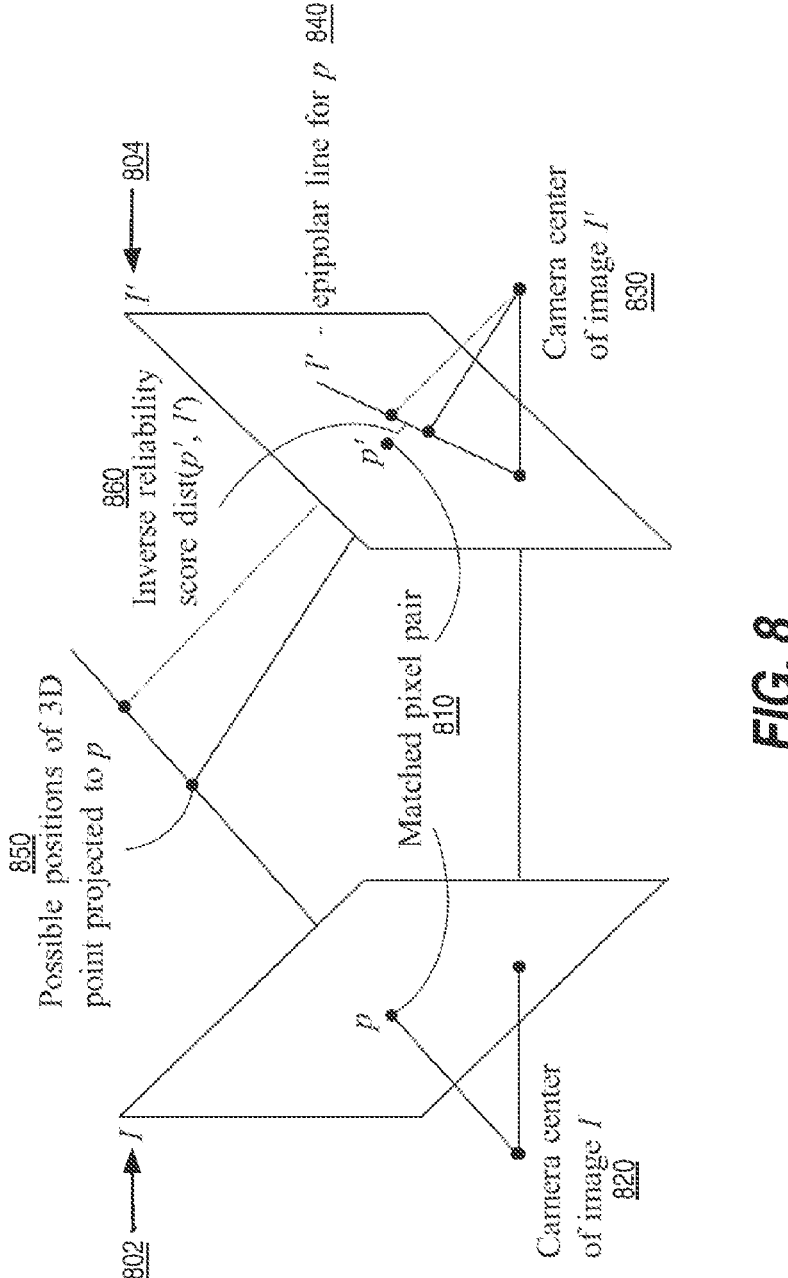
FIG. 8 is block diagram illustrating a schematic of a keyframe image pair used for inverse reliability score determination, in accordance with implementations of the disclosure.

For each image pair, the in situ keypoint learning circuitry 750 can perform keypoint detection and matching using a current detector neural network. For each matched keypoint, an inverse reliability score is calculated. FIG. 8 is block diagram illustrating a schematic 800 of a keyframe image pair used for inverse reliability score determination, in accordance with implementations of the disclosure.

As shown in schematic 800, a keyframe image pair includes frame I 802 and frame I' 804. Given image I 802, each pixel in the image 802 is a projection of a 3D point in the real world. However, the exact position of this 3D point is not known (because it is not known how far this point is from the camera). It is known that the pixel point lies on a ray which can be calculated from the pixel's coordinates, the camera pose 820, 830, and intrinsics (e.g., focal length, aspect ratio, etc.). Then, if all the possible positions of this 3D point are re-projected to another camera, a ray on the corresponding image I' 804 is obtained.

Therefore, for an image pair (I, I') 802, 804 with known camera poses and intrinsics, for each pixel p 810 in I 802, it is known that the corresponding pixel 810 in I' 804, if exists, should lie on a ray l'840. This ray 840 is named the epipolar line for p in computer vision, and can be calculated as l'=Fp, where F is the fundamental matrix between I 802 and I' 804, and F can be calculated from the relative camera pose and camera intrinsics.

Then, for pixel p 810 in image I 802, if a matched pixel p' 810 in I' 804 is identified based on a keypoint detection and matching method, a reliability of this matching can be measured by the pixel distance between p' 810 and the epipolar line l' 840. The matching is considered to be unreliable if the distance is not close to zero, thus dist(p', l') 860 can be referred to as the inverse reliability score 112.

If depth values are available, the exact pixel position p'* of the reprojection 850 can be calculated. The pixel distance between p' and p'* may be measured, which gives even more supervision. However, because depth values from real-world depth cameras are noisy (compared to the accuracy of pose estimates), it may be suggested to use dist(p', l')+γ*dist(p', p'*) as the inverse reliability score, where γ is a weight parameter set according to the prior accuracy of the depth values.

In implementations herein, instead of using the VSLAM localization accuracy as a reward signal (which is sparse) or using ground-truth keypoint matchings (which are unavailable), implementations of the disclosure utilize the final pose given by a localization system to generate dense (pixel-wise) supervision signals.

Implementations can incorporate the inverse reliability score described above into any existing training pipeline with a few adaptions (such as with a training loss to penalize large inverse reliability score). However, implementations herein can add a separate head to the detector neural network for regressing the reliability and training to this head with in-situ data, instead of directly fine-tuning the head for the keypoint reliability score. The regressed reliability score (representing mainly semantic stability) can then be combined with the original detection score (representing mainly geometric plausibility) to get the final keypoint score at inference time. In this way, the training may be accomplished with less data.

In one example, training data can be continually collected from multiple systems (e.g., robots) deployed in a particular place (e.g., a hospital or a warehouse) and stored on an edge server. Then, the detector neural network could be periodically trained for keypoint detection with this data, and then the updated network could be deployed on the systems (e.g., robots). The data collection and training can also be triggered on-demand by business logic, for example, whenever the VSLAM result differs from the final pose estimate by a distance larger than a predefined tolerance.

Training data may also be collected in similar places (e.g., multiple warehouses) to a cloud server, and the detector neural network subsequently trained for wider deployment in future. In either case, the network can learn keypoint reliability in a particular scene or a particular class of scenes.

Figure 9:
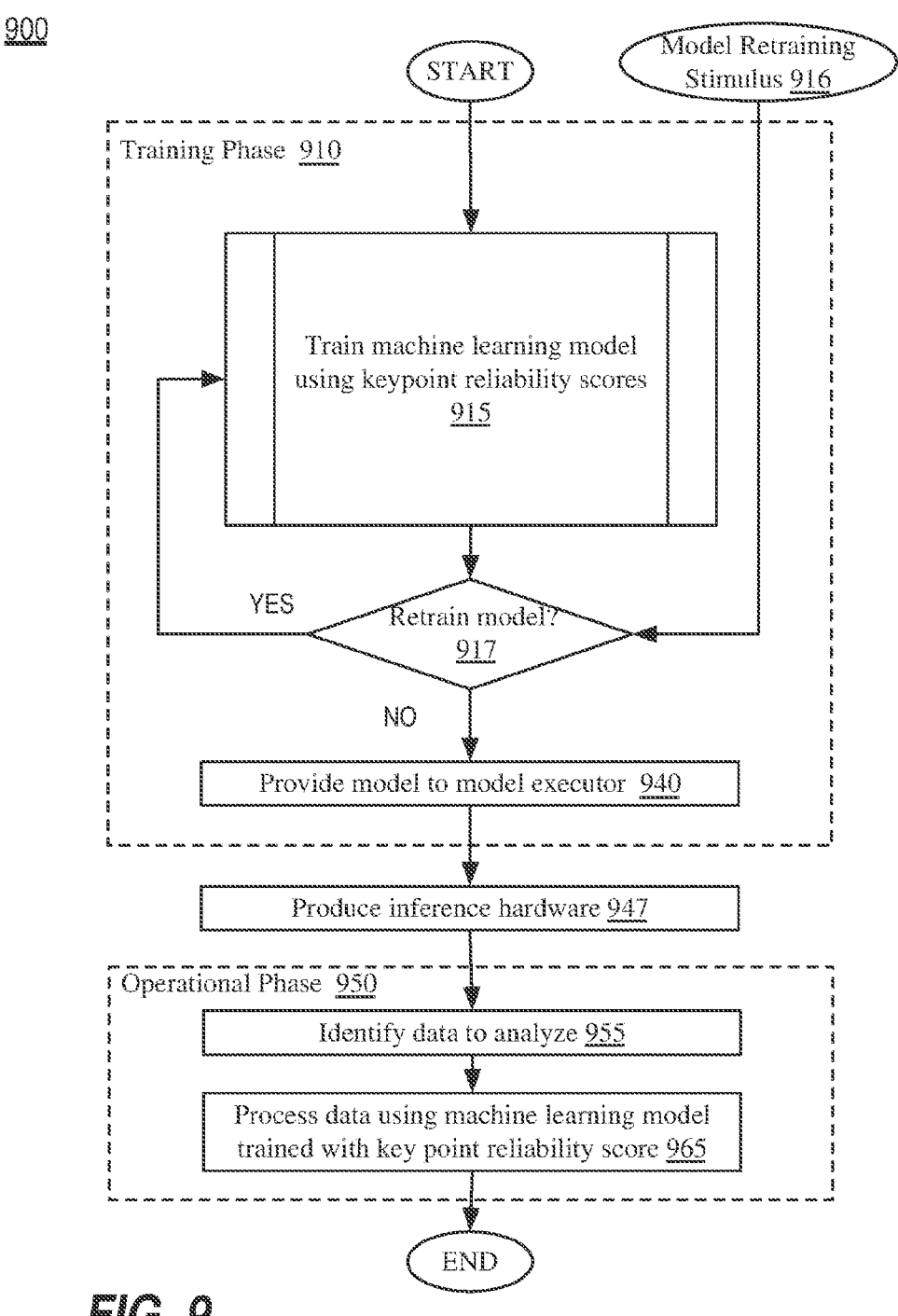
FIG. 9 is a flowchart representative of machine-readable instructions with may be executed to implement learning reliable keypoints in situ with introspective self-supervision, in accordance with implementations of the disclosure.

FIG. 9 is a flow diagram illustrating an embodiment of a method 900 for implementing the example model trainer 125 and/or model executor 105 utilizing keypoint reliability generator 150 of FIG. 1, in accordance with implementations herein. Method 900 may be performed by processing logic that may comprise hardware (e.g., circuitry, dedicated logic, programmable logic, etc.), software (such as instructions run on a processing device), or a combination thereof. More particularly, the method 900 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 900 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-8 may not be repeated or discussed hereafter. In one implementation, a model trainer, such as model trainer 125 implementing keypoint reliability generator 150 of FIG. 1, and/or model executor, such as model executor 105 implementing keypoint reliability generator 150 of FIG. 1, may perform method 900.

The training phase 910 of the program of FIG. 9 includes an example model trainer 125 training a machine learning model. In examples disclosed herein, the training phase 910 includes the model trainer 110 training (block 915) the machine learning model for learning reliable keypoints in situ with introspective self-supervision, in accordance with implementations of the disclosure.

If the example model trainer 125 determines (block 917) that the model should be retrained (e.g., block 917 returns a value of YES), the example model trainer 125 retrains the model (block 915). In examples disclosed herein, the model trainer 125 may determine whether the model should be retrained based on a model retraining stimulus. (Block 916). In one implementation, model retraining stimulus 916 may be part of a separate detection node for regressing reliability and training with in-situ data, as described herein. In some examples, the model retraining stimulus 916 may be whether the labeled distributions are exceeding a retrain limit threshold. In other examples, the model retraining stimulus 916 may be a user indicating that the model should be retrained. In some examples, the training phase 910 may begin at block 917, where the model trainer 125 determines whether initial training and/or subsequent training is to be performed. That is, the decision of whether to perform training may be performed based on, for example, a request from a user, a request from a system administrator, an amount of time since prior training being performed having elapsed (e.g., training is to be performed on a weekly basis, etc.), the presence of new training data being made available, etc.

Once the example model trainer 125 has retrained the model, or if the example model trainer 125 determines that the model should not be retrained (e.g., block 917 returns a value of NO), the example trained machine learning model is provided to a model executor. (Block 940). In examples disclosed herein, the model is provided to a system to convert the model into a fully pipelined inference hardware format. (Block 947). In other examples, the model is provided over a network such as the Internet.

The operational phase 950 of the program of FIG. 9 then begins. During the operational phase 950, a model executor, such as model executor 105 of FIG. 1, identifies data to be analyzed by the model. (Block 955). In some examples, the data may be images to classify. The model executor processes the data using the machine learning model provided from the training phase 910. (Block 965). In some examples, the model executor may process the data using a machine learning model trained with a keypoint reliability score.

FIG. 10 is a flow diagram illustrating an embodiment of a method 1000 for training a neural network for learning reliable keypoints in situ with introspective self-supervision, in accordance with implementations herein. Method 1000 may be performed by processing logic that may comprise hardware (e.g., circuitry, dedicated logic, programmable logic, etc.), software (such as instructions run on a processing device), or a combination thereof. More particularly, the method 1000 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 1000 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-9 may not be repeated or discussed hereafter. In one implementation, a processing device implementing a keypoint reliability generator or keypoint detector, such as keypoint reliability generator 150 of FIG. 1 or keypoint detector 620 of FIG. 6, may perform method 1000.

Method 1000 begins at block 1010 where the processing device may provide view-overlapped keyframe pair from a pose graph that is generated by a VSLAM process executed by the processing device. At block 1020, the processing device may determine a keypoint match from the view-overlapped keyframe pair based on a keypoint detection and matching process. In one implementation, the keypoint match corresponding to a keypoint. Then, at block 1030, the processing device may calculate an inverse reliability score based on matched pixels corresponding to the keypoint match in the view-overlapped keyframe pair.

Subsequently, at block 1040, the processing device may identify a supervision signal associated with the keypoint match, the supervision signal comprising a keypoint reliability score of the keypoint based on a final pose output of the VSLAM. Lastly, at block 1050, the processing device may train a keypoint detection neural network using the keypoint match, the inverse reliability score, and the keypoint reliability score.

FIG. 11 is a flow diagram illustrating an embodiment of a method 1100 for inference using a neural network trained for learning reliable keypoints in situ with introspective self-supervision, in accordance with implementations herein. Method 1100 may be performed by processing logic that may comprise hardware (e.g., circuitry, dedicated logic, programmable logic, etc.), software (such as instructions run on a processing device), or a combination thereof. More particularly, the method 1100 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 1100 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-10 may not be repeated or discussed hereafter. In one implementation, a processing device implementing a keypoint reliability generator or keypoint detector, such as keypoint reliability generator 150 of FIG. 1 or keypoint detector 620 of FIG. 6, may perform method 1100.

Method 1100 begins at block 1110 where the processing device may detect, using a trained detection neural network, a keypoint in image data. At block 1120, the processing device may determine, based on camera pose generation for the image data, a location of the keypoint. In one implementation, the location comprising a coordinate of the keypoint.

Subsequently, at block 1130, the processing device may compare the coordinate of the keypoint with save coordinate data to determine whether the coordinate is previously identified as a known keypoint. At block 1140, the processing device may generate, based on the comparing the coordinate, a supervision signal comprising a keypoint reliability score for the keypoint. Lastly, at block 1150, the processing device may provide the keypoint reliability score as keypoint feedback for training of the detection neural network.

Figure 12:
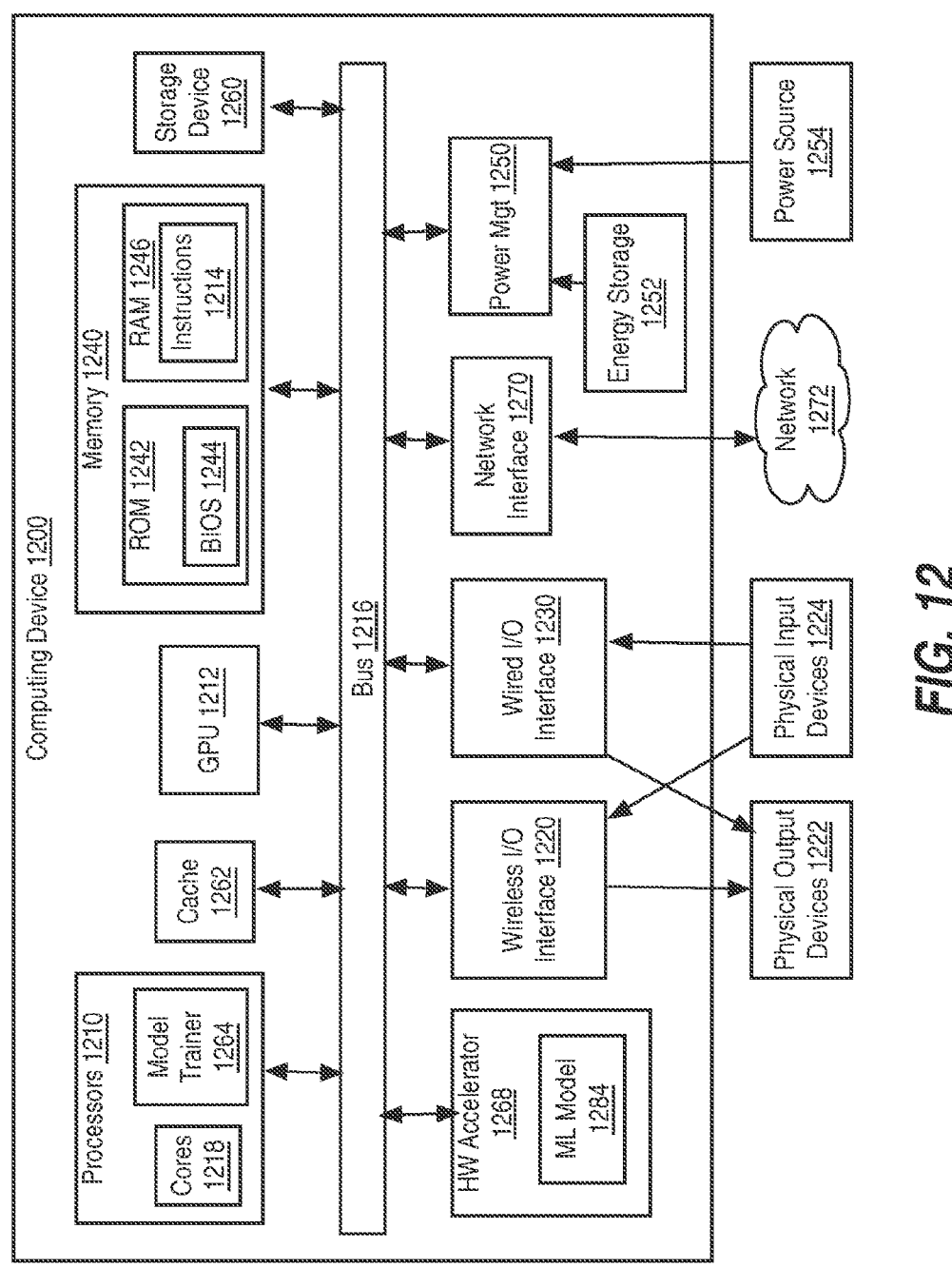
FIG. 12 is a schematic diagram of an illustrative electronic computing device to enable learning reliable keypoints in situ with introspective self-supervision, according to some embodiments.

FIG. 12 is a schematic diagram of an illustrative electronic computing device to enable learning reliable keypoints in situ with introspective self-supervision, according to some embodiments. In some embodiments, the computing device 1200 includes one or more processors 1210 including one or more processors cores 1218 and a model trainer 1264, the model trainer 1264 to enable learning reliable keypoints in situ with introspective self-supervision, as provided in FIGS. 1-11. In some embodiments, the computing device 1200 includes a hardware accelerator 1268, the hardware accelerator including a machine learning model 1284. In some embodiments, the computing device is to implement learning reliable keypoints in situ with introspective self-supervision using the machine learning model 1284, as provided in FIGS. 1-11.

The computing device 1200 may additionally include one or more of the following: cache 1262, a graphical processing unit (GPU) 1212 (which may be the hardware accelerator in some implementations), a wireless input/output (I/O) interface 1220, a wired I/O interface 1230, memory circuitry 1240, power management circuitry 1250, non-transitory storage device 1260, and a network interface 1270 for connection to a network 1272. The following discussion provides a brief, general description of the components forming the illustrative computing device 1200. Example, non-limiting computing devices 1200 may include a desktop computing device, blade server device, workstation, or similar device or system.

In embodiments, the processor cores 1218 are capable of executing machine-readable instruction sets 1214, reading data and/or instruction sets 1214 from one or more storage devices 1260 and writing data to the one or more storage devices 1260. Those skilled in the relevant art can appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. For example, machine-readable instruction sets 1214 may include instructions to implement learning reliable keypoints in situ with introspective self-supervision, as provided in FIGS. 1-11.

The processor cores 1218 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 1200 includes a bus or similar communications link 1216 that communicably couples and facilitates the exchange of information and/or data between various system components including the processor cores 1218, the cache 1262, the graphics processor circuitry 1212, one or more wireless I/O interfaces 1220, one or more wired I/O interfaces 1230, one or more storage devices 1260, and/or one or more network interfaces 1270. The computing device 1200 may be referred to in the singular herein, but this is not intended to limit the embodiments to a single computing device 1200, since in some embodiments, there may be more than one computing device 1200 that incorporates, includes, or contains any number of communicably coupled, collocated, or remote networked circuits or devices.

The processor cores 1218 may include any number, type, or combination of currently available or future developed devices capable of executing machine-readable instruction sets.

The processor cores 1218 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 12 are of conventional design. Consequently, such blocks do not have to be described in further detail herein, as they can be understood by those skilled in the relevant art. The bus 1216 that interconnects at least some of the components of the computing device 1200 may employ any currently available or future developed serial or parallel bus structures or architectures.

The system memory 1240 may include read-only memory ("ROM") 1242 and random access memory ("RAM") 1246. A portion of the ROM 1242 may be used to store or otherwise retain a basic input/output system ("BIOS") 1244. The BIOS 1244 provides basic functionality to the computing device 1200, for example by causing the processor cores 1218 to load and/or execute one or more machine-readable instruction sets 1214. In embodiments, at least some of the one or more machine-readable instruction sets 1214 cause at least a portion of the processor cores 1218 to provide, create, produce, transition, and/or function as a dedicated, specific, and particular machine, for example a word processing machine, a digital image acquisition machine, a media playing machine, a gaming system, a communications device, a smartphone, or similar.

The computing device 1200 may include at least one wireless input/output (I/O) interface 1220. The at least one wireless I/O interface 1220 may be communicably coupled to one or more physical output devices 1222 (tactile devices, video displays, audio output devices, hardcopy output devices, etc.). The at least one wireless I/O interface 1220 may communicably couple to one or more physical input devices 1224 (pointing devices, touchscreens, keyboards, tactile devices, etc.). The at least one wireless I/O interface 1220 may include any currently available or future developed wireless I/O interface. Example wireless I/O interfaces include, but are not limited to: BLUETOOTH®, near field communication (NFC), and similar.

The computing device 1200 may include one or more wired input/output (I/O) interfaces 1230. The at least one wired I/O interface 1230 may be communicably coupled to one or more physical output devices 1222 (tactile devices, video displays, audio output devices, hardcopy output devices, etc.). The at least one wired I/O interface 1230 may be communicably coupled to one or more physical input devices 1224 (pointing devices, touchscreens, keyboards, tactile devices, etc.). The wired I/O interface 1230 may include any currently available or future developed I/O interface. Example wired I/O interfaces include, but are not limited to, universal serial bus (USB), IEEE 1394 ("Fire-Wire"), and similar.

The computing device 1200 may include one or more communicably coupled, non-transitory, data storage devices 1260. The data storage devices 1260 may include one or more hard disk drives (HDDs) and/or one or more solid-state storage devices (SSDs). The one or more data storage devices 1260 may include any current or future developed storage appliances, network storage devices, and/or systems. Non-limiting examples of such data storage devices 1260 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 1260 may include one or more removable storage devices, such as one or more flash drives, flash memories, flash storage units, or similar appliances or devices capable of communicable coupling to and decoupling from the computing device 1200.

The one or more data storage devices 1260 may include interfaces or controllers (not shown) communicatively coupling the respective storage device or system to the bus 1216. The one or more data storage devices 1260 may store, retain, or otherwise contain machine-readable instruction sets, data structures, program modules, data stores, databases, logical structures, and/or other data useful to the processor cores 1218 and/or graphics processor circuitry 1212 and/or one or more applications executed on or by the processor cores 1218 and/or graphics processor circuitry 1212. In some instances, one or more data storage devices 1260 may be communicably coupled to the processor cores 1218, for example via the bus 1216 or via one or more wired communications interfaces 1230 (e.g., Universal Serial Bus or USB); one or more wireless communications interfaces 1220 (e.g., Bluetooth®, Near Field Communication or NFC); and/or one or more network interfaces 1270 (IEEE 802.3 or Ethernet, IEEE 802.11, or Wi-Fi®, etc.).

Processor-readable instruction sets 1214 and other programs, applications, logic sets, and/or modules may be stored in whole or in part in the system memory 1240. Such instruction sets 1214 may be transferred, in whole or in part, from the one or more data storage devices 1260. The instruction sets 1214 may be loaded, stored, or otherwise retained in system memory 1240, in whole or in part, during execution by the processor cores 1218 and/or graphics processor circuitry 1212.

The computing device 1200 may include power management circuitry 1250 that controls one or more operational aspects of the energy storage device 1252. In embodiments, the energy storage device 1252 may include one or more primary (i.e., non-rechargeable) or secondary (i.e., rechargeable) batteries or similar energy storage devices. In embodiments, the energy storage device 1252 may include one or more supercapacitors or ultracapacitors. In embodiments, the power management circuitry 1250 may alter, adjust, or control the flow of energy from an external power source 1254 to the energy storage device 1252 and/or to the computing device 1200. The power source 1254 may include, but is not limited to, a solar power system, a commercial electric grid, a portable generator, an external energy storage device, or any combination thereof.

For convenience, the processor cores 1218, the graphics processor circuitry 1212, the wireless I/O interface 1220, the wired I/O interface 1230, the storage device 1260, and the network interface 1270 are illustrated as communicatively coupled to each other via the bus 1216, thereby providing connectivity between the above-described components. In alternative embodiments, the above-described components may be communicatively coupled in a different manner than illustrated in FIG. 12. For example, one or more of the above-described components may be directly coupled to other components, or may be coupled to each other, via one or more intermediary components (not shown). In another example, one or more of the above-described components may be integrated into the processor cores 1218 and/or the graphics processor circuitry 1212. In some embodiments, all or a portion of the bus 1216 may be omitted and the components are coupled directly to each other using suitable wired or wireless connections.

Flowcharts representative of example hardware logic, machine readable instructions, hardware implemented state machines, and/or any combination thereof for implementing the system 100 of FIG. 1, for example, are shown in any one or more of FIGS. 9-11. The machine-readable instructions may be one or more executable programs or portion(s) of an executable program for execution by a computer processor such as the processor 1210 shown in the example computing device 1200 discussed above in connection with FIG. 12. The program may be embodied in software stored on a non-transitory computer readable storage medium such as a CD-ROM, a floppy disk, a hard drive, a DVD, a Blu-ray disk, or a memory associated with the processor 1210, but the entire program and/or parts thereof could alternatively be executed by a device other than the processor 1210 and/or embodied in firmware or dedicated hardware. Further, although the example program is described with reference to the flowcharts illustrated in any one or more of FIGS. 9-11, many other methods of implementing the example systems may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein.

In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 9-11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The following examples pertain to further embodiments. Example 1 is an apparatus to facilitate learning reliable keypoints in situ with introspective self-supervision. The apparatus of Example 1 comprises one or more processors to provide a view-overlapped keyframe pair from a pose graph that is generated by a visual simultaneous localization and mapping (VSLAM) process executed by the one or more processors; determine a keypoint match from the view-overlapped keyframe pair based on a keypoint detection and matching process, the keypoint match corresponding to a keypoint; calculate an inverse reliability score based on matched pixels corresponding to the keypoint match in the view-overlapped keyframe pair; identify a supervision signal associated with the keypoint match, the supervision signal comprising a keypoint reliability score of the keypoint based on a final pose output of the VSLAM process; and train a keypoint detection neural network using the keypoint match, the inverse reliability score, and the keypoint reliability score.

In Example 2, the subject matter of Example 1 can optionally include wherein the view-overlapped keyframe pair comprises a pair of image frames captured by a camera, and wherein the keypoint match corresponds to a keypoint present in each of the image frames in the view-overlapped keyframe pair. In Example 3, the subject matter of any one of Examples 1-2 can optionally include wherein the keypoint comprises a landmark in a scene of the view-overlapped keyframe pair. In Example 4, the subject matter of any one of Examples 1-3 can optionally include wherein the keypoint detection neural network comprises a convolutional neural network (CNN).

In Example 5, the subject matter of any one of Examples 1-4 can optionally include wherein the view-overlapped keyframe pair comprises a matched pixel set (p, p'), and wherein the inverse reliability score comprises a pixel distance between p' and an epipolar line for p. In Example 6, the subject matter of any one of Examples 1-5 can optionally include wherein the keypoint reliability score is based on a comparison of coordinates of the keypoint in the final pose output generated by the VSLAM process to saved coordinates for a scene of the view-overlapped keyframe pair.

In Example 7, the subject matter of any one of Examples 1-6 can optionally include wherein the one or more processors are further to: regress the inverse reliability score; train a separate head of the keypoint detection neural network with the regressed inverse reliability score; and combine the regressed inverse reliability score with the keypoint reliability score to obtain a final keypoint reliability score. In Example 8, the subject matter of any one of Examples 1-7 can optionally include wherein the apparatus comprises a robot utilizing the VSLAM process for localization of the robot. In Example 9, the subject matter of any one of Examples 1-8 can optionally include wherein the one or more processors comprise one or more of a graphics processor, an application processor, and another processor, wherein the one or more processors are co-located on a common semiconductor package.

Example 10 is a non-transitory computer-readable storage medium for facilitating learning reliable keypoints in situ with introspective self-supervision. The non-transitory computer-readable storage medium of Example 10 having stored thereon executable computer program instructions that, when executed by one or more processors, cause the one or more processors to perform operations comprising providing a view-overlapped keyframe pair from a pose graph that is generated by a visual simultaneous localization and mapping (VSLAM) process executed by the one or more processors; determining a keypoint match from the view-overlapped keyframe pair based on a keypoint detection and matching process, the keypoint match corresponding to a keypoint; calculating an inverse reliability score based on matched pixels corresponding to the keypoint match in the view-overlapped keyframe pair; identifying a supervision signal associated with the keypoint match, the supervision signal comprising a keypoint reliability score of the keypoint based on a final pose output of the VSLAM process; and training a keypoint detection neural network using the keypoint match, the inverse reliability score, and the keypoint reliability score.

In Example 11, the subject matter of Example 10 can optionally include wherein the view-overlapped keyframe pair comprises a pair of image frames captured by a camera, and wherein the keypoint match corresponds to a keypoint present in each of the image frames in the view-overlapped keyframe pair. In Example 12, the subject matter of Examples 10-11 can optionally include wherein the keypoint detection neural network comprises a convolutional neural network (CNN).

In Example 13, the subject matter of Examples 10-12 can optionally include wherein the view-overlapped keyframe pair comprises a matched pixel set (p, p'), and wherein the inverse reliability score comprises a pixel distance between p' and an epipolar line for p. In Example 14, the subject matter of Examples 10-13 can optionally include wherein the keypoint reliability score is based on a comparison of coordinates of the keypoint in the final pose output generated by the VSLAM process to saved coordinates for a scene of the view-overlapped keyframe pair. In Example 15, the subject matter of Examples 10-14 can optionally include wherein the operations further comprise: regressing the inverse reliability score; training a separate head of the keypoint detection neural network with the regressed inverse reliability score; and combining the regressed inverse reliability score with the keypoint reliability score to obtain a final keypoint reliability score to utilize during an inference stage of the trained keypoint detection neural network.

Example 16 is a method for facilitating learning reliable keypoints in situ with introspective self-supervision. The method of Example 16 can include detecting, by one or more processors using a trained detection neural network, a keypoint in image data; determining, based on a camera pose generation for the image data, a location of the keypoint, the location comprising a coordinate of the keypoint; comparing the coordinate of the keypoint with saved coordinate data to determine whether the coordinate is previously identified as a known keypoint; generating, based on comparing the coordinate, a supervision signal comprising a keypoint reliability score for the keypoint; and providing the keypoint reliability score as keypoint feedback for re-training of the trained detection neural network.

In Example 17, the subject matter of Example 16 can optionally include wherein the keypoint reliability score is a higher value on a spectrum of values responsive to the coordinate of the keypoint being previously identified as a known keypoint and is smaller value on the spectrum of values responsive to the coordinate of the keypoint not being previously identified as a known keypoint. In Example 18, the subject matter of Examples 16-17 can optionally include wherein providing the keypoint reliability score comprises saving the keypoint reliability score as metadata for the keypoint.

In Example 19, the subject matter of Examples 16-18 can optionally include wherein the keypoint reliability score is utilized for generation of a pose in a visual simultaneous localization and mapping (VSLAM) graph of a VSLAM process executed by the one or more processors. In Example 20, the subject matter of Examples 16-19 can optionally include wherein the one or more processors are comprised in a robot utilizing the VSLAM process for localization of the robot.

Example 21 is a system for facilitating learning reliable keypoints in situ with introspective self-supervision. The system of Example 21 can optionally include a memory to store a block of data, and a processor communicably coupled to the memory to: provide a view-overlapped keyframe pair from a pose graph that is generated by a visual simultaneous localization and mapping (VSLAM) process executed by the one or more processors; determine a keypoint match from the view-overlapped keyframe pair based on a keypoint detection and matching process, the keypoint match corresponding to a keypoint; calculate an inverse reliability score based on matched pixels corresponding to the keypoint match in the view-overlapped keyframe pair; identify a supervision signal associated with the keypoint match, the supervision signal comprising a keypoint reliability score of the keypoint based on a final pose output of the VSLAM process; and train a keypoint detection neural network using the keypoint match, the inverse reliability score, and the keypoint reliability score.

In Example 22, the subject matter of Example 21 can optionally include wherein the view-overlapped keyframe pair comprises a pair of image frames captured by a camera, and wherein the keypoint match corresponds to a keypoint present in each of the image frames in the view-overlapped keyframe pair. In Example 23, the subject matter of any one of Examples 21-22 can optionally include wherein the keypoint comprises a landmark in a scene of the view-overlapped keyframe pair. In Example 24, the subject matter of any one of Examples 21-23 can optionally include wherein the keypoint detection neural network comprises a convolutional neural network (CNN).

In Example 25, the subject matter of any one of Examples 21-24 can optionally include wherein the view-overlapped keyframe pair comprises a matched pixel set (p, p'), and wherein the inverse reliability score comprises a pixel distance between p' and an epipolar line for p. In Example 26, the subject matter of any one of Examples 21-25 can optionally include wherein the keypoint reliability score is based on a comparison of coordinates of the keypoint in the final pose output generated by the VSLAM process to saved coordinates for a scene of the view-overlapped keyframe pair.

In Example 27, the subject matter of any one of Examples 21-26 can optionally include wherein the one or more processors are further to: regress the inverse reliability score; train a separate head of the keypoint detection neural network with the regressed inverse reliability score; and combine the regressed inverse reliability score with the keypoint reliability score to obtain a final keypoint reliability score. In Example 28, the subject matter of any one of Examples 21-27 can optionally include wherein the apparatus comprises a robot utilizing the VSLAM process for localization of the robot. In Example 29, the subject matter of any one of Examples 21-28 can optionally include wherein the one or more processors comprise one or more of a graphics processor, an application processor, and another processor, wherein the one or more processors are co-located on a common semiconductor package.

Example 30 is a method for facilitating learning reliable keypoints in situ with introspective self-supervision. The method of Example 30 can include providing a view-overlapped keyframe pair from a pose graph that is generated by a visual simultaneous localization and mapping (VSLAM) process executed by the one or more processors; determining a keypoint match from the view-overlapped keyframe pair based on a keypoint detection and matching process, the keypoint match corresponding to a keypoint; calculating an inverse reliability score based on matched pixels corresponding to the keypoint match in the view-overlapped keyframe pair; identifying a supervision signal associated with the keypoint match, the supervision signal comprising a keypoint reliability score of the keypoint based on a final pose output of the VSLAM process; and training a keypoint detection neural network using the keypoint match, the inverse reliability score, and the keypoint reliability score.

In Example 31, the subject matter of Example 30 can optionally include wherein the view-overlapped keyframe pair comprises a pair of image frames captured by a camera, and wherein the keypoint match corresponds to a keypoint present in each of the image frames in the view-overlapped keyframe pair. In Example 32, the subject matter of Examples 30-31 can optionally include wherein the keypoint detection neural network comprises a convolutional neural network (CNN).

In Example 33, the subject matter of Examples 30-32 can optionally include wherein the view-overlapped keyframe pair comprises a matched pixel set (p, p'), and wherein the inverse reliability score comprises a pixel distance between p' and an epipolar line for p. In Example 34, the subject matter of Examples 30-33 can optionally include wherein the keypoint reliability score is based on a comparison of coordinates of the keypoint in the final pose output generated by the VSLAM process to saved coordinates for a scene of the view-overlapped keyframe pair. In Example 35, the subject matter of Examples 30-34 can optionally include wherein the operations further comprise: regressing the inverse reliability score; training a separate head of the keypoint detection neural network with the regressed inverse reliability score; and combining the regressed inverse reliability score with the keypoint reliability score to obtain a final keypoint reliability score to utilize during an inference stage of the trained keypoint detection neural network.

Example 36 is an apparatus for facilitating learning reliable keypoints in situ with introspective self-supervision comprising means for providing a view-overlapped keyframe pair from a pose graph that is generated by a visual simultaneous localization and mapping (VSLAM) process executed by the one or more processors; means for determining a keypoint match from the view-overlapped keyframe pair based on a keypoint detection and matching process, the keypoint match corresponding to a keypoint; means for calculating an inverse reliability score based on matched pixels corresponding to the keypoint match in the view-overlapped keyframe pair; means for identifying a supervision signal associated with the keypoint match, the supervision signal comprising a keypoint reliability score of the keypoint based on a final pose output of the VSLAM process; and means for training a keypoint detection neural network using the keypoint match, the inverse reliability score, and the keypoint reliability score. In Example 37, the subject matter of Example 36 can optionally include the apparatus further configured to perform the method of any one of the Examples 31 to 35.

Example 38 is at least one machine readable medium comprising a plurality of instructions that in response to being executed on a computing device, cause the computing device to carry out a method according to any one of Examples 30-25. Example 39 is an apparatus for facilitating learning reliable keypoints in situ with introspective self-supervision, configured to perform the method of any one of Examples 30-35. Example 40 is an apparatus for facilitating learning reliable keypoints in situ with introspective self-supervision, comprising means for performing the method of any one of Examples 30 to 35.

Example 41 is an apparatus for facilitating learning reliable keypoints in situ with introspective self-supervision comprising means for detecting, by one or more processors using a trained detection neural network, a keypoint in image data; means for determining, based on a camera pose generation for the image data, a location of the keypoint, the location comprising a coordinate of the keypoint; means for comparing the coordinate of the keypoint with saved coordinate data to determine whether the coordinate is previously identified as a known keypoint; means for generating, based on comparing the coordinate, a supervision signal comprising a keypoint reliability score for the keypoint; and means for providing the keypoint reliability score as keypoint feedback for re-training of the trained detection neural network. In Example 42, the subject matter of Example 41 can optionally include the apparatus further configured to perform the method of any one of the Examples 17 to 20.

Example 43 is at least one machine readable medium comprising a plurality of instructions that in response to being executed on a computing device, cause the computing device to carry out a method according to any one of Examples 16-20. Example 44 is an apparatus for facilitating learning reliable keypoints in situ with introspective self-supervision, configured to perform the method of any one of Examples 16-20. Example 45 is an apparatus for facilitating learning reliable keypoints in situ with introspective self-supervision, comprising means for performing the method of any one of Examples 16 to 20. Specifics in the Examples may be used anywhere in one or more embodiments.

The foregoing description and drawings are to be regarded in an illustrative rather than a restrictive sense. Persons skilled in the art can understand that various modifications and changes may be made to the embodiments described herein without departing from the broader spirit and scope of the features set forth in the appended claims.

What is claimed is:

1. An apparatus comprising:

one or more processors to:

provide a view-overlapped keyframe pair from a pose graph that is generated by a visual simultaneous localization and mapping (VSLAM) process executed by the one or more processors, wherein the view-overlapped keyframe pair comprises a matched pixel set (p, p');

determine a keypoint match from the view-overlapped keyframe pair based on a keypoint detection and matching process, the keypoint match corresponding to a keypoint;

calculate an inverse reliability score based on matched pixels corresponding to the keypoint match in the view-overlapped keyframe pair, wherein the inverse reliability score comprises a pixel distance between p' and an epipolar line for p;

identify a supervision signal associated with the keypoint match, the supervision signal comprising a keypoint reliability score of the keypoint based on a final pose output of the VSLAM process; and train a keypoint detection neural network using the keypoint match, the inverse reliability score, and the keypoint reliability score.

2. The apparatus of claim 1, wherein the view-overlapped keyframe pair comprises a pair of image frames captured by a camera, and wherein the keypoint match corresponds to the keypoint that is present in each of the image frames in the view- overlapped keyframe pair.

3. The apparatus of claim 2, wherein the keypoint comprises a landmark in a scene of the view-overlapped keyframe pair.

4. The apparatus of claim 1, wherein the keypoint detection neural network comprises a convolutional neural network (CNN).

5. The apparatus of claim 1, wherein the keypoint reliability score is based on a comparison of coordinates of the keypoint in the final pose output generated by the VSLAM process to saved coordinates for a scene of the view-overlapped keyframe pair.

6. The apparatus of claim 1, wherein the one or more processors are further to:

regress the inverse reliability score into a regressed inverse reliability score;

train a separate head of the keypoint detection neural network with the regressed inverse reliability score; and combine the regressed inverse reliability score with the keypoint reliability score to obtain a final keypoint reliability score.

7. The apparatus of claim 1, wherein the apparatus comprises a robot utilizing the VSLAM process for localization of the robot.

8. The apparatus of claim 1, wherein the one or more processors comprise one or more of a graphics processor, an application processor, and another processor, wherein the one or more processors are co-located on a common semiconductor package.

9. A non-transitory computer-readable storage medium having stored thereon executable computer program instructions that, when executed by one or more processors, cause the one or more processors to perform operations comprising:

providing a view-overlapped keyframe pair from a pose graph that is generated by a visual simultaneous localization and mapping (VSLAM) process executed by the one or more processors, wherein the view-overlapped keyframe pair comprises a matched pixel set (p, p');

determining a keypoint match from the view-overlapped keyframe pair based on a keypoint detection and matching process, the keypoint match corresponding to a keypoint;

calculating an inverse reliability score based on matched pixels corresponding to the keypoint match in the view-overlapped keyframe pair, wherein the inverse reliability score comprises a pixel distance between p' and an epipolar line for p;

identifying a supervision signal associated with the keypoint match, the supervision signal comprising a keypoint reliability score of the keypoint based on a final pose output of the VSLAM process; and training a keypoint detection neural network using the keypoint match, the inverse reliability score, and the keypoint reliability score.

10. The non-transitory computer-readable storage medium of claim 9, wherein the view-overlapped keyframe pair comprises a pair of image frames captured by a camera, and wherein the keypoint match corresponds to the keypoint that is present in each of the image frames in the view-overlapped keyframe pair.

11. The non-transitory computer-readable storage medium of claim 9, wherein the keypoint detection neural network comprises a convolutional neural network (CNN).

12. The non-transitory computer-readable storage medium of claim 9, wherein the keypoint reliability score is based on a comparison of coordinates of the keypoint in the final pose output generated by the VSLAM process to saved coordinates for a scene of the view-overlapped keyframe pair.

13. The non-transitory computer-readable storage medium of claim 9, wherein the operations further comprise:

regressing the inverse reliability score into a regressed inverse reliability score;

training a separate head of the keypoint detection neural network with the regressed inverse reliability score; and combining the regressed inverse reliability score with the keypoint reliability score to obtain a final keypoint reliability score to utilize during an inference stage of the keypoint detection neural network.

14. A method for facilitating learning reliable keypoints in situ with introspective self-supervision, the method comprising:

providing a view-overlapped keyframe pair from a pose graph that is generated by a visual simultaneous localization and mapping (VSLAM) process executed by one or more processors, wherein the view-overlapped keyframe pair comprises a matched pixel set (p, p');

determining a keypoint match from the view-overlapped keyframe pair based on a keypoint detection and matching process, the keypoint match corresponding to a keypoint;

calculating an inverse reliability score based on matched pixels corresponding to the keypoint match in the view-overlapped keyframe pair, wherein the inverse reliability score comprises a pixel distance between p' and an epipolar line for p;

identifying a supervision signal associated with the keypoint match, the supervision signal comprising a keypoint reliability score of the keypoint based on a final pose output of the VSLAM process; and training a keypoint detection neural network using the keypoint match, the inverse reliability score, and the keypoint reliability score.

15. The method of claim 14, wherein the view-overlapped keyframe pair comprises a pair of image frames captured by a camera, and wherein the keypoint match corresponds to the keypoint that is present in each of the image frames in the view- overlapped keyframe pair.

16. The method of claim 14, wherein the keypoint detection neural network comprises a convolutional neural network (CNN).

17. The method of claim 14, wherein the keypoint reliability score is based on a comparison of coordinates of the keypoint in the final pose output generated by the VSLAM process to saved coordinates for a scene of the view-overlapped keyframe pair.

\* \* \* \* \*